(12) United States Patent
Upadhye et al.

(10) Patent No.: US 12,372,232 B2
(45) Date of Patent: Jul. 29, 2025

(54) BURNERS AND ADDITIVE MANUFACTURING METHODS

(71) Applicant: 3M INNOVATIVE PROPERTIES COMPANY, St. Paul, MN (US)

(72) Inventors: Aniruddha A. Upadhye, St. Paul, MN (US); Mark A. Strobel, Maplewood, MN (US); Elizaveta Y. Plotnikov, Woodbury, MN (US); Luke E. Heinzen, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 43 days.

(21) Appl. No.: 18/402,823

(22) Filed: Jan. 3, 2024

(65) Prior Publication Data
US 2024/0133547 A1  Apr. 25, 2024

Related U.S. Application Data

(63) Continuation of application No. 17/309,293, filed as application No. PCT/IB2019/061306 on Dec. 23, 2019, now Pat. No. 11,898,748.
(Continued)

(51) Int. Cl.
*B22F 10/25* (2021.01)
*B22F 10/85* (2021.01)
(Continued)

(52) U.S. Cl.
CPC .............. *F23D 14/02* (2013.01); *B22F 10/25* (2021.01); *B22F 10/85* (2021.01); *F23D 14/56* (2013.01); *F23D 2213/00* (2013.01)

(58) Field of Classification Search
CPC ...... F23D 14/02; F23D 14/56; F23D 2213/00; B22F 10/85; B22F 10/25
(Continued)

(56) References Cited

U.S. PATENT DOCUMENTS

| 5,139,414 A | 8/1992 | Nakamoto et al. |
| 5,273,212 A | 12/1993 | Gerhardus et al. |

(Continued)

FOREIGN PATENT DOCUMENTS

| DE | 102004016333 B4 | 8/2006 |
| DE | 102017129835 A1 | 6/2018 |

(Continued)

OTHER PUBLICATIONS

International Search Report for PCT International Application No. PCT/IB2019/061306, mailed on Jul. 1, 2020, 7 pages.

*Primary Examiner* — Avinash A Savani
(74) *Attorney, Agent, or Firm* — Adrian L. Pishko

(57) ABSTRACT

Burners and methods of making burner bodies via a focused beam are disclosed. In an aspect, a burner includes (a) a burner body and (b) at least one connector configured to supply at least a fuel and an oxidizer to the burner body. The burner body includes (1) a plurality of passageways; (2) a first major surface; (3) a plurality of ports at the first major surface, each port defined by an end of one of the passageways; and either: (4a) at least one heating element in or adjacent to at least one of the plurality of passageways that increases the temperature of a wall of the at least one of the plurality of passageways; or (4b) a cooling chamber directly adjacent to three or more of the plurality of passageways. The burner body includes a number of layers of metal directly bonded to each other. Further, methods are provided, including receiving, by a manufacturing device having one or more processors, a digital object comprising data specifying a burner body; and generating, with the manufacturing device by an additive manufacturing process, the burner body based on the digital object. A system is also provided, including a display that displays a 3D model of a burner body; and one or more processors that, in response to (Continued)

the 3D model selected by a user, cause a 3D printer to create a physical object of the burner body.

12 Claims, 13 Drawing Sheets

Related U.S. Application Data

(60) Provisional application No. 62/784,979, filed on Dec. 26, 2018.

(51) Int. Cl.
  *F23D 14/02* (2006.01)
  *F23D 14/56* (2006.01)

(58) Field of Classification Search
  USPC ............................................. 431/354
  See application file for complete search history.

(56) References Cited

U.S. PATENT DOCUMENTS

| | | | |
|---|---|---|---|
| 5,370,084 A * | 12/1994 | Skowyra | F22B 31/0084 |
| | | | 122/4 D |
| 7,635,264 B2 | 12/2009 | Strobel et al. | |
| 8,181,891 B2 | 5/2012 | Ziminsky et al. | |
| 8,252,212 B2 | 8/2012 | Hagihara et al. | |
| 8,272,859 B2 | 9/2012 | Hagihara et al. | |
| 8,393,892 B2 | 3/2013 | Hagihara et al. | |
| 8,424,311 B2 | 4/2013 | York et al. | |
| 9,518,742 B2 | 12/2016 | York et al. | |
| 2007/0031791 A1 | 2/2007 | Cinader, Jr. et al. | |
| 2010/0143601 A1 | 6/2010 | Hawtof et al. | |
| 2014/0170571 A1 | 6/2014 | Casasanta, III et al. | |
| 2015/0285501 A1 | 10/2015 | Dicintio et al. | |
| 2015/0285502 A1 | 10/2015 | Dicintio et al. | |
| 2016/0025374 A1 | 1/2016 | Karkow et al. | |
| 2016/0186575 A1 | 6/2016 | Lacy et al. | |
| 2016/0313075 A1 * | 10/2016 | Taylor | F28F 9/02 |
| 2017/0307216 A1 * | 10/2017 | Bareiss | F23R 3/06 |
| 2018/0039254 A1 * | 2/2018 | North | B33Y 50/00 |
| 2018/0104894 A1 | 4/2018 | Fung et al. | |
| 2018/0135884 A1 | 5/2018 | Karkow et al. | |
| 2019/0102815 A1 | 4/2019 | Norman | |

FOREIGN PATENT DOCUMENTS

| | | |
|---|---|---|
| EP | 0609502 A1 | 8/1994 |
| GB | 191219490 A | 8/1913 |
| GB | 1205432 A | 9/1970 |
| JP | 2002372209 A | 12/2002 |
| WO | 199425206 A1 | 11/1994 |

* cited by examiner

10μm

10μm

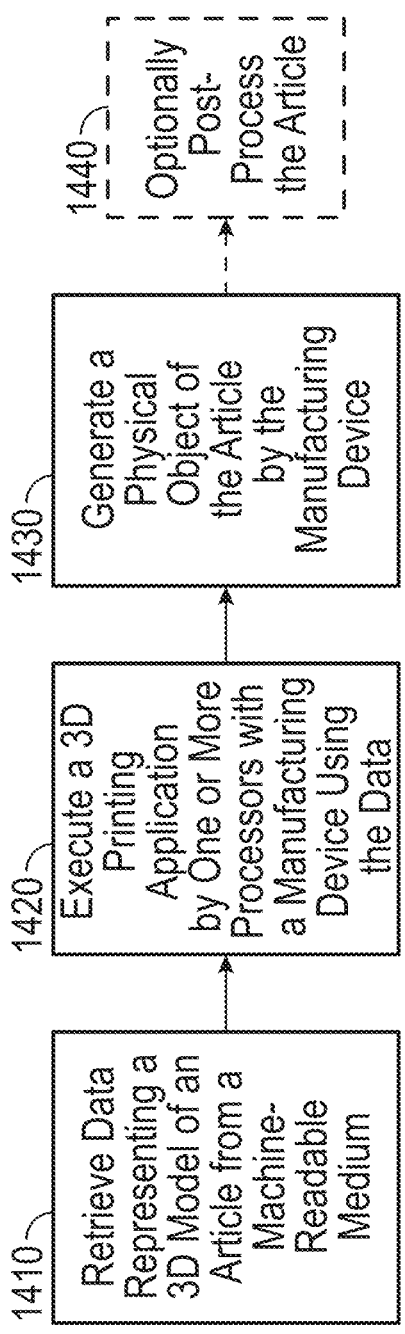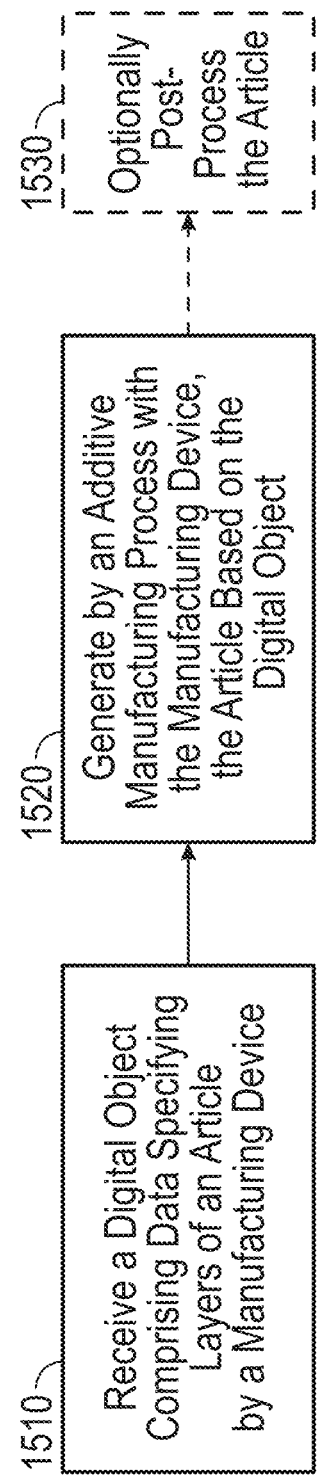

BURNERS AND ADDITIVE MANUFACTURING METHODS

TECHNICAL FIELD

The present disclosure broadly relates to burners and additive manufacturing methods for making such burners or portions of burners.

BACKGROUND

Flame treating is one of the surface modification technologies that is used to modify surfaces of polymeric films for increased wettability and adhesion promotion. FIG. 1 provides a schematic for a flame treatment apparatus often used. More particularly, the apparatus 1000 includes a film 110 passing through a nip roll 120 and a cooled metal backing roll 130, and 5-10 millimeters below the film 110 wrapped under the backing roll 130 a ribbon burner 140 is disposed, directing a flame 150 (generated from, e.g., fuel and an oxidizer provided into the ribbon burner 140 in the direction of the arrow) at a major surface 112 of the film 110.

Ribbon burners are by far the most widely used burner for industrial flame treatment. In comparison with other possible burner designs, ribbon burners are the most stable over a wide range of flame parameters and enable the highest flame powers per unit area of burner surface. A typical ribbon burner is formed by tightly packing corrugated strips of stainless steel into a casing or housing (e.g., the burner body) to form rows of somewhat elliptical ports. Into the 2000s, the primary ribbon burner design available to industry contained four rows of ports formed by stainless steel ribbons mounted in cast iron, steel, or brass housings. The maximum flame power, or capacity, of these 4-port burners were limited to about 1150 W/cm of burner length and about 1040 W/cm$^2$ of burner surface. By the mid-2000s, 6-port and 8-port burners consisting of stainless steel ribbons mounted in extruded aluminum housings were available for industrial use. These burners have power capacities of up to 2300 W/cm and 1400 W/cm$^2$. As the total number of rows of ports increase, the ribbon surface temperature increases, causing overheating and warping of the central ribbons; this factor that eventually limits the number of usable rows of ports in ribbon burners.

A drawback to a ribbon burner is that at high powers, flames are less stable, which can lead to decreased cross-web uniformity of flame treatment.

SUMMARY

In a first aspect, a burner is provided. The burner includes (a) a burner body and (b) at least one connector configured to supply at least a fuel and an oxidizer to the burner body. The burner body includes (1) a plurality of passageways; (2) a first major surface; (3) a plurality of ports at the first major surface, each port defined by an end of one of the passageways; and either: (4a) at least one heating element in or adjacent to at least one of the plurality of passageways that increases the temperature of a wall of the at least one of the plurality of passageways; or (4b) a cooling chamber directly adjacent to three or more of the plurality of passageways. The burner body includes a number of layers of metal directly bonded to each other.

In a second aspect, a method of making a burner body is provided. The method includes sequential steps, including (a) a subprocess including sequentially: (i) depositing a layer of loose powder particles in a region, wherein the loose powder particles include metallic particles and wherein the layer of loose powder particles has substantially uniform thickness; and (ii) selectively treating an area of the layer of loose powder particles with irradiation by a focused beam to bond metallic particles together. The method further includes (b) independently carrying out step (a) a plurality of times to generate a burner body comprising the bonded powder particles and remaining loose powder particles, wherein in each step (a), the loose powder particles are independently selected. The method also includes (c) separating substantially all of the remaining loose powder particles from the burner body.

In a third aspect, a non-transitory machine-readable medium is provided. The non-transitory medium has data representing a three-dimensional model of a burner body that, when accessed by one or more processors interfacing with a 3D printer, cause the 3D printer to create all or part of the burner body. The burner body includes (1) a plurality of passageways; (2) a first major surface; (3) a plurality of ports at the first major surface, each port defined by an end of one of the passageways; and either: (4a) at least one heating element in or adjacent to at least one of the plurality of passageways that increases the temperature of a wall of the at least one of the plurality of passageways; or (4b) a cooling chamber directly adjacent to three or more of the plurality of passageways. The burner body includes a number of layers of metal directly bonded to each other.

In a fourth aspect, another method is provided. The method includes (a) retrieving, from a non-transitory machine-readable medium, data representing a 3D model of a burner body; (b) executing, by one or more processors, a 3D printing application interfacing with a manufacturing device using the data; and (c) generating, by the manufacturing device, a physical object of the burner body. The burner body includes (1) a plurality of passageways; (2) a first major surface; (3) a plurality of ports at the first major surface, each port defined by an end of one of the passageways; and either: (4a) at least one heating element in or adjacent to at least one of the plurality of passageways that increases the temperature of a wall of the at least one of the plurality of passageways; or (4b) a cooling chamber directly adjacent to three or more of the plurality of passageways. The burner body includes a number of layers of metal directly bonded to each other.

In a fifth aspect, a burner body is provided, generated using the method of the fourth aspect.

In a sixth aspect, a further method of forming a burner body is provided. The method includes (a) receiving, by a manufacturing device having one or more processors, a digital object comprising data specifying a plurality of layers of a burner body; and (b) generating, with the manufacturing device by an additive manufacturing process, the burner body based on the digital object. The burner body includes (1) a plurality of passageways; (2) a first major surface; (3) a plurality of ports at the first major surface, each port defined by an end of one of the passageways; and either: (4a) at least one heating element in or adjacent to at least one of the plurality of passageways that increases the temperature of a wall of the at least one of the plurality of passageways; or (4b) a cooling chamber directly adjacent to three or more of the plurality of passageways. The burner body includes a number of layers of metal directly bonded to each other.

In a seventh aspect, a system is provided. The system includes (a) a display that displays a 3D model of a burner body; and (b) one or more processors that, in response to the 3D model selected by a user, cause a 3D printer to create a physical object of the burner body. The burner body includes (1) a plurality of passageways; (2) a first major surface; (3) a plurality of ports at the first major surface, each port defined by an end of one of the passageways; and either: (4a) at least one heating element in or adjacent to at least one of the plurality of passageways that increases the temperature of a wall of the at least one of the plurality of passageways; or (4b) a cooling chamber directly adjacent to three or more of the plurality of passageways. The burner body includes a number of layers of metal directly bonded to each other.

Burners made using additive manufacturing processes can be fabricated with precise burner port dimensions that can stabilize flames at high powers, which can improve cross-web uniformity of flame treatment and enables flame treatment of materials at higher processing speeds. Moreover, more complex burner designs can more readily be created via additive manufacturing than using traditional burner formation methods (e.g., welding, machining, etc.), easily incorporating features such as cooling chambers and heating elements into the burners.

The above summary is not intended to describe each embodiment or every implementation of aspects of the inventions. The details of various embodiments are set forth in the description below. Other features, objects, and advantages will be apparent from the description as well as the appended claims.

BRIEF DESCRIPTION OF THE DRAWINGS

FIG. 14 is a high-level flow chart of an exemplary article manufacturing process.

FIG. 15 is a high-level flow chart of an exemplary article additive manufacturing process.

Figure 1:
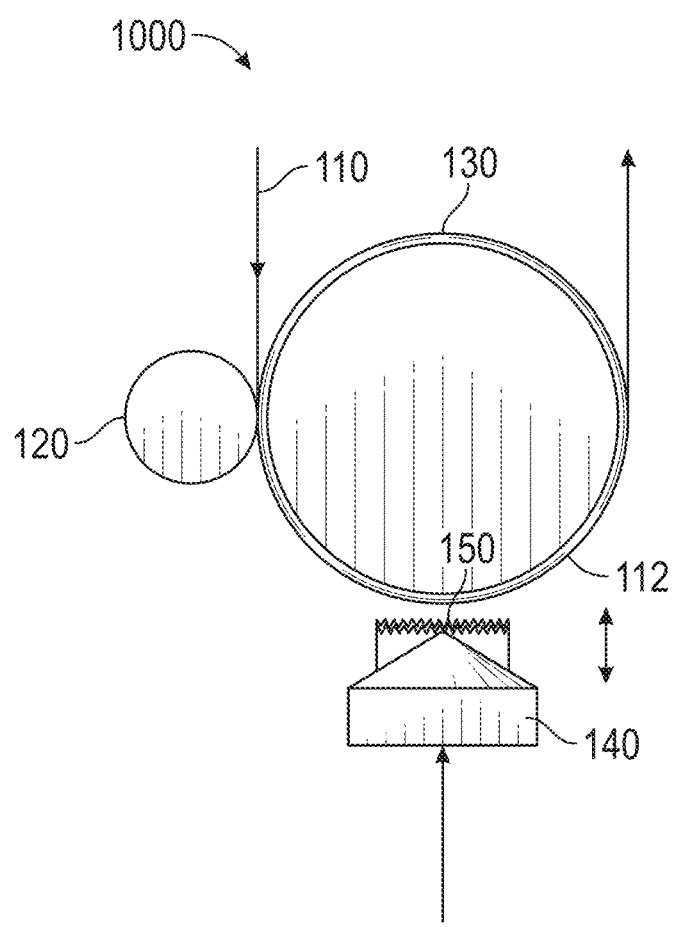
FIG. 1 is a schematic cross-sectional side view of a flame treatment apparatus according to prior art, including a ribbon burner.

Repeated use of reference characters in the specification and drawings is intended to represent the same or analogous features or elements of the disclosure. Drawings may not be to scale. It should be understood that numerous other modifications and embodiments can be devised by those skilled in the art, which fall within the scope and spirit of the principles of the disclosure. The figures may not be drawn to scale.

DETAILED DESCRIPTION

The present disclosure provides metal burners and methods of making metal burners. The methods include additive manufacturing methods, which have advantages over traditional methods, such as being able to make unique shapes that are not possible to make by machining and welding metal.

Glossary

Certain terms are used throughout the description and the claims that, while for the most part are well known, may require some explanation. It should be understood that:

As used herein, "alloy" means a metal made by combining two or more metallic elements. As used herein, a "nickel alloy" means an alloy including nickel and one or more other metallic elements, thus encompasses a "nickel chromium alloy" as well as a "nickel chromium iron alloy".

As used herein, "component" means an element, compound, polymer, species, or material.

As used herein, "fuel" means a component that produces heat or power when burned.

As used herein, "oxidizer" means a component that causes oxidation of another component during a combustion process.

As used herein, "non-oxidizer" means a component that does not cause oxidation of any other component during a combustion process.

As used herein, "non-combustible" means a component that is not a major participant in a combustion reaction, although the component may be affected by combustion physically (e.g., change of state (such as softening, melting, evaporating, or sublimating) or change of shape (such as spheroidization or agglomeration)), and/or chemically (e.g., change of chemical phase (such as conversion from alpha to gamma), conversion to glass, nucleation, crystallization, or chemical decomposition and/or synthesis). By "major participant" is meant that the component makes up more than 50 volume % (vol.%) of the total components that participate in a combustion reaction, thus a component that is not a major participant makes up less than 50 vol.%, 40 vol.% or less, 30 vol.% or less, 20 vol.% or less, or 10 vol.% or less of the total components that participate in a combustion reaction.

As used herein, "passageway" means a space defined by at least one wall, which has an aspect ratio of length to diameter of 1:2 or greater, 1:1, 2:1, 3:1, 5:1, 7:1, 10:1, 25:1, 50:1, or 100:1 or greater. A suitable passageway may be provided by a tube.

As used herein, "port" means an open end of a passageway, defined by a major surface of an article, such as a burner body.

As used herein, "chamber" means an enclosed space or cavity defined by one or more walls. The chamber typically has at least one opening for access of a material to the chamber.

As used in this specification and the appended embodiments, the singular forms "a", "an", and "the" include plural referents unless the content clearly dictates otherwise. Thus, for example, reference to layers containing "a metal" includes a mixture of two or more metals. As used in this specification and the appended embodiments, the term "or" is generally employed in its sense including "and/or" unless the content clearly dictates otherwise.

As used in this specification, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

Various exemplary embodiments of the disclosure will now be described with particular reference to the Drawings. Exemplary embodiments of the present disclosure may take on various modifications and alterations without departing from the spirit and scope of the disclosure. Accordingly, it is to be understood that the embodiments of the present disclosure are not to be limited to the following described exemplary embodiments, but are to be controlled by the limitations set forth in the claims and any equivalents thereof.

In a first aspect, a burner is provided. The burner includes (a) a burner body and (b) at least one connector configured to supply at least a fuel and an oxidizer to the burner body. The burner body includes (1) a plurality of passageways; (2) a first major surface; (3) a plurality of ports at the first major surface, each port defined by an end of one of the passageways; and either: (4a) at least one heating element in or adjacent to at least one of the plurality of passageways that increases the temperature of a wall of the at least one of the plurality of passageways; or (4b) a cooling chamber directly adjacent to three or more of the plurality of passageways. The burner body includes a number of layers of metal directly bonded to each other. Suitable connectors include, for instance, screw and thread connectors, and/or pipes or tubes attached to the burner body either through welds, compression fittings, threaded connectors, or by being integrally formed with the burner body during an additive manufacturing process.

Figure 2A:
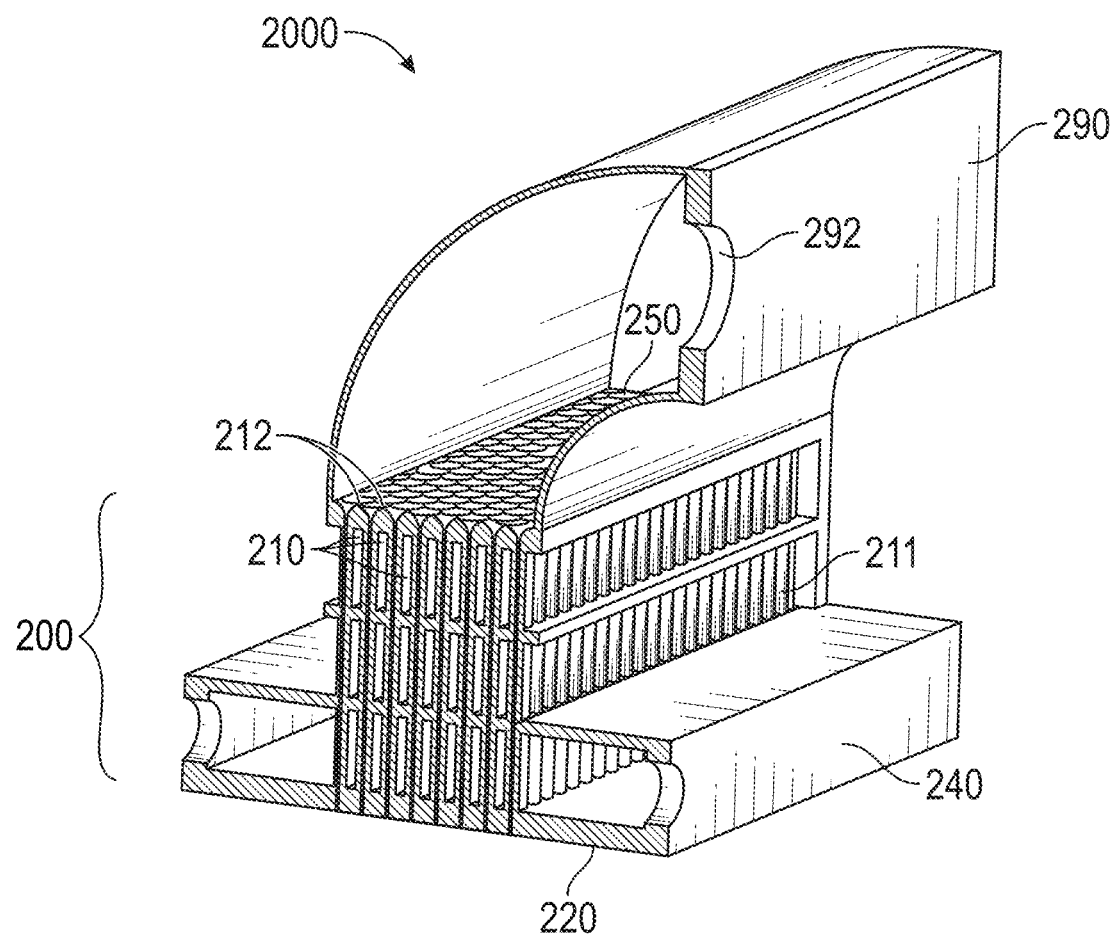
FIG. 2A is a schematic partial perspective view of an exemplary burner body including a cooling chamber, preparable according to the present disclosure.
Figure 2B:
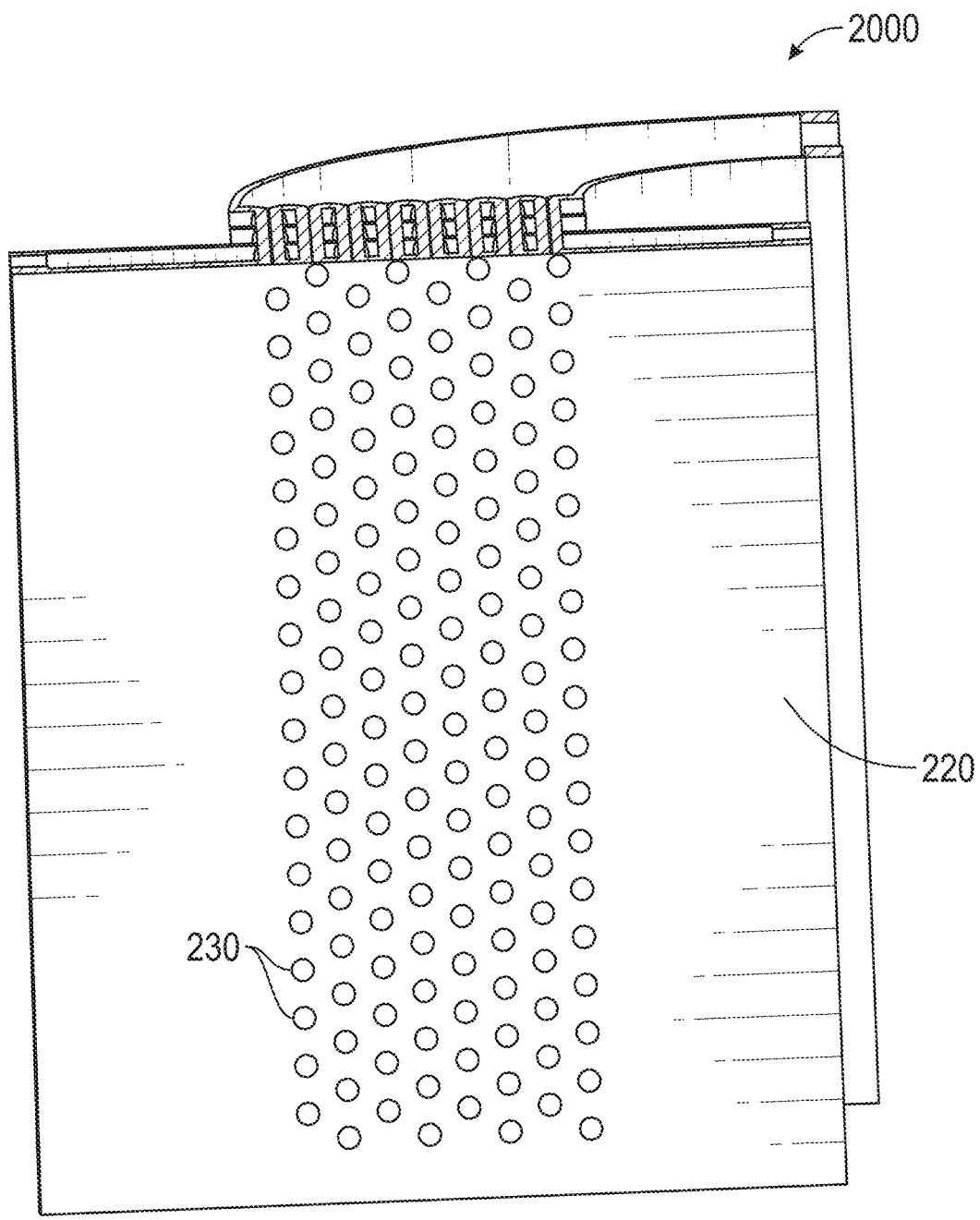
FIG. 2B is another schematic partial perspective view of the exemplary burner body of FIG. 2A.

More particularly, referring to FIGS. 2A-2B, an exemplary burner 2000 includes (a) a burner body 200 and (b) at least one connector 290 configured to supply at least a fuel and an oxidizer to the burner body 200. The burner body 200 includes a plurality of passageways 210; a first major surface 220; a plurality of ports 230 at the first major surface 220, each port 230 defined by an end of one of the passageways 210; and a cooling chamber 240 directly adjacent to three or more of the plurality of passageways 210. Typically, one or more of the passageways 210 has the shape of a tube 211. In some embodiments, at least one passageway splits into two or more passageways. In certain embodiments, two or more passageways combine into one passageway. Referring again to FIG. 2A, in some embodiments, a connector 290 is in the form of a chamber through which at least the fuel and the oxidizer may be pumped into the passageways 210, entering through passageway openings 212. In the illustrated embodiment, the connector 290 includes an aperture 292 to attach the fuel and oxidizer source to the connector 290.

In some embodiments, the cooling chamber is present in the burner body. Optionally, the cooling chamber 240 is located closer to the first major surface 220 of the burner body 200 than to an opposing major surface 250 of the burner body 200. Such a location assists in providing cooling to areas closest to the flames anchored to the ports 230 at the first major surface 220 of the burner body 200. The cooling chamber 240 preferably surrounds three or more of the plurality of passageways 210, 4 or more, 5, 6, 7, 8, 9, 10, 12, 15, 20, 25, 30, 35, 40, 45, 50, or more; and up to all of the passageways. An advantage of using one or more cooling chambers is that more passageways can be cooled by the same chamber, as opposed to using a cooling channel adjacent to just one or two passageways. The cooling chamber design may thus provide some simplicity to the cooling process.

Figure 3:
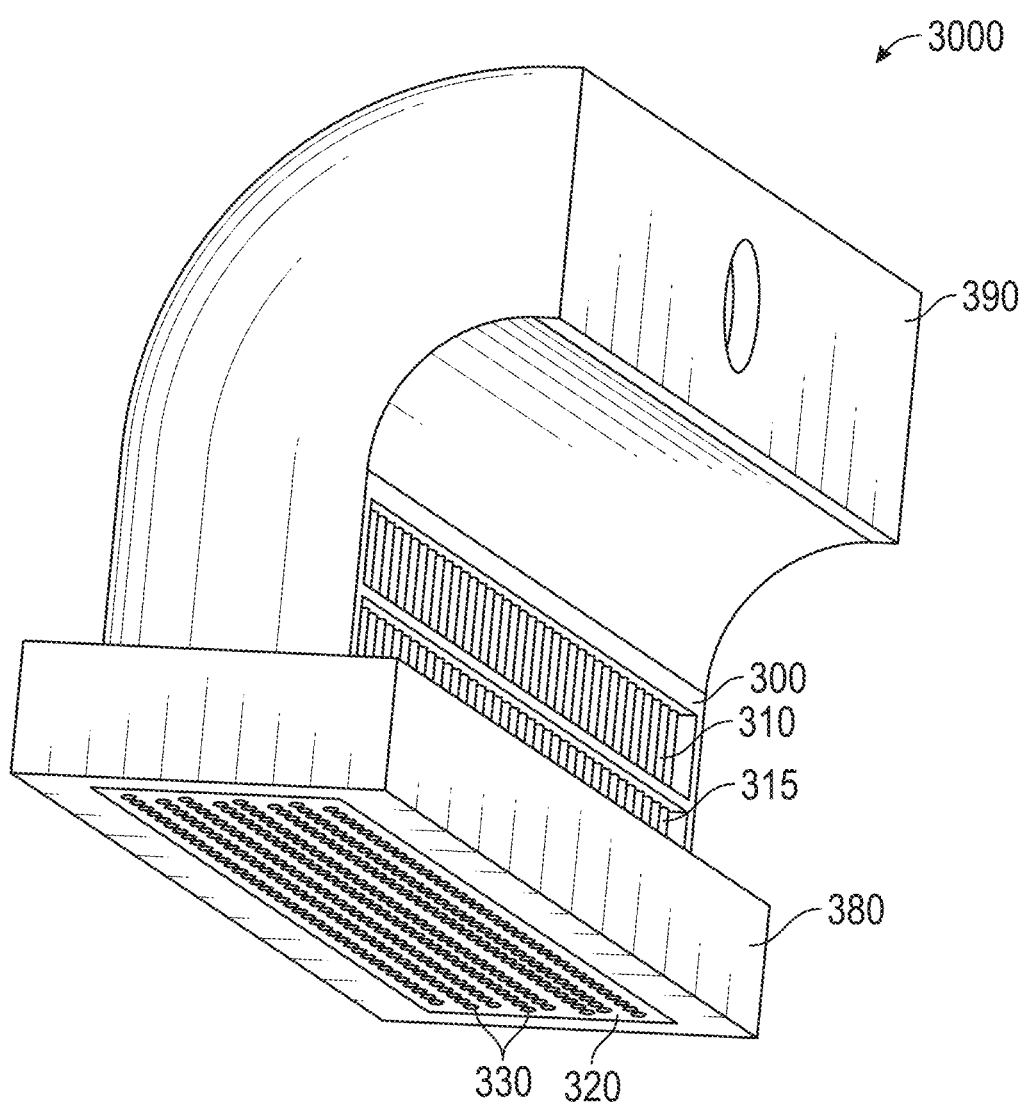
FIG. 3 is a schematic partial perspective side view of an exemplary burner body including a heating element, preparable according to the present disclosure.

Referring to FIG. 3, another exemplary burner 3000 includes (a) a burner body 300 and (b) at least one connector 390 configured to supply at least a fuel and an oxidizer to the burner body 300. The burner body 300 includes a plurality of passageways 310; a first major surface 320; a plurality of ports 330 at the first major surface 320, each port 330 defined by an end of one of the passageways 310; and at least one heating element 380 adjacent to at least one of the plurality of passageways 310 that increases the temperature of a wall 315 of the at least one of the plurality of passageways 310. The heating element 380 may be readily attached to the wall of one or more passageways 310 via additive manufacturing processes when forming a burner body, either an interior wall or, as shown in FIG. 3, an exterior wall 315 of a passageway 310.

In some embodiments, at least one heating element is present in the burner body. Optionally, the heating element(s) comprise a metal, a ceramic, and/or a heating fluid (e.g., oil). When a heating element comprises a metal, the metal has a different thermal conductivity than the wall of the at least one of the plurality of passageways. In certain embodiments, the heating element is directly attached to the wall of the at least one of the plurality of passageways. A specific structure may be included to increase heat transfer (e.g., individual posts to help transfer more heat than just would be transferred by the passageway wall). In some embodiments, the heating element includes at least one heating coil. Suitable metals to use for the heating element include for instance, silver, copper, gold, stainless steel, nickel, and nickel alloys.

Often, the metal of the burner body includes steel or a nickel alloy, preferably a nickel chromium alloy. Suitable metals include for instance and without limitation, stainless steel, titanium alloys, nickel alloys, nickel chromium alloys, or nickel chromium iron alloys. A commercially available stainless steel can be obtained under the trade designation from Sandvik Osprey (Neath, United Kingdom). Exemplary commercially available nickel chromium alloys and nickel chromium iron alloys can be obtained under the trade designation INCONEL from American Special Metals, Corp. Specific alloys include INCONEL Alloy 600 (e.g., nickel (+cobalt): 72 wt. % minimum, chromium: 14-17 wt. %, iron: 6-10 wt. %, and small amounts of other elements); INCONEL Alloy 601 (e.g., nickel: 58-63 wt. %, chromium: 15-21 wt. %, aluminum: 1-1.5 wt. %, iron: balance, and small amounts of other elements); INCONEL Alloy 22 (e.g., chromium: 22-22.5 wt. %, molybdenum: 12.5-14.5 wt. %, tungsten: 3 wt. %, iron: 2-6 wt. %, cobalt: 2.5 wt. % maximum, nickel: balance, and small amounts of other elements); INCONEL Alloy 617 (e.g., nickel: 44.5 wt. % minimum, chromium: 20-24 wt. %, cobalt: 10-15 wt. %, molybdenum: 8-10 wt. %, iron: 3 wt. % maximum, and small amounts of other elements); INCONEL Alloy 625 (e.g., nickel: 58 wt. % minimum, chromium: 20-23 wt. %, iron: 5 wt. % maximum, molybdenum: 8-10 wt. %, niobium (plus tantalum): 3.15-4.15 wt. % maximum, and small amounts of other elements); INCONEL Alloy 690 (e.g., nickel: 58 wt. % minimum, chromium: 27-31 wt. %, and iron: 7-11 wt. %, and small amounts of other elements); INCONEL Alloy 718 (e.g., nickel: 50-55 wt. %, chromium: 17-21 wt. %, niobium (plus tantalum): 4.75-5.5 wt. %, molybdenum: 2.8-3.3 wt. %, iron: balance, and small amounts of other elements); INCONEL Alloy 725 (e.g., nickel: 55-59 wt. %, chromium: 19-22.5 wt. %, molybdenum: 7-9.5 wt. %, niobium (plus tantalum): 2.75-4 wt. %, iron: balance, and small amounts of other elements); INCONEL Alloy X-750 (e.g., nickel: 70 wt. % minimum, chromium: 14-17 wt. %, iron: 5-9 wt. %, titanium: 2.25-2.75 wt. %, and small amounts of other elements); INCONEL Alloy C-276 (e.g., molybdenum: 15-17 wt. %, chromium: 14.5-16.5 wt. %, iron: 4-7 wt. %, tungsten: 3-4.5 wt. %, nickel: balance, and small amounts of other elements); and INCONEL Alloy HX (e.g., chromium: 20.5-23 wt. %, cobalt: 0.5-2.5 wt. %, iron: 17-20 wt. %, molybdenum: 8-10 wt. %, nickel: balance, and small amounts of other elements).

In some embodiments, just the burner body will be formed by additive manufacturing, whereas in other embodiments one or more additional elements of a burner or burner system will be formed by additive manufacturing, as desired. Separate, combinable components may be formed and assembled, or multiple components may be formed integrally via additive manufacturing (e.g., burner body and connector). In certain embodiments, pilot holes for threaded connectors may be formed by additive manufacturing, followed by mechanical addition of the threads in the pilot holes following the additive manufacturing process.

Figure 7:
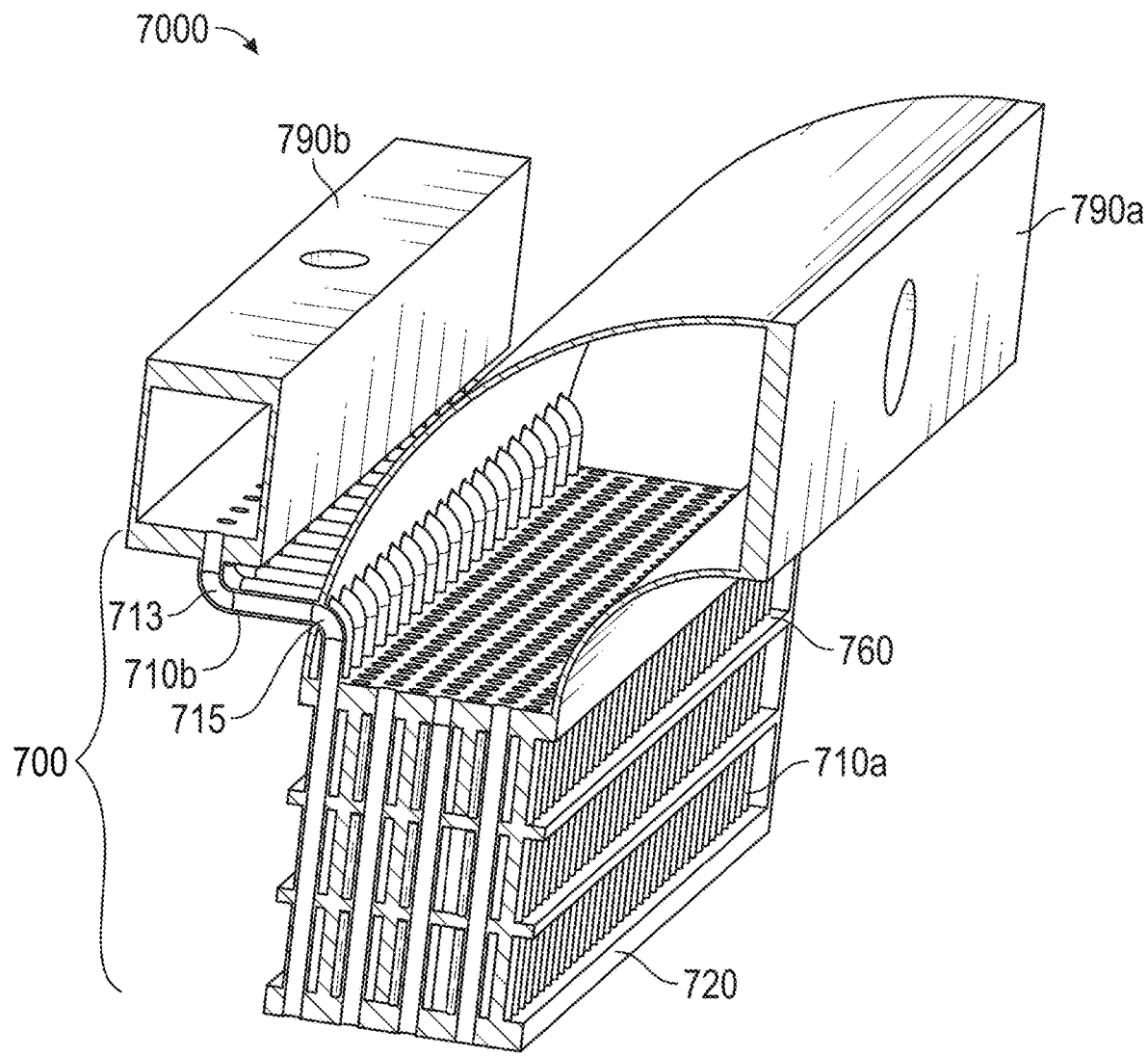
FIG. 7 is a schematic perspective cross-sectional view of an exemplary burner body including a passageway with two portions each having a bend, preparable according to the present disclosure.

Various design features are readily achievable using additive manufacturing of a burner and/or burner body. For instance, referring to FIG. 7, in some embodiments, a burner 7000 comprises a burner body 700 in which at least one of the plurality of passageways 710b includes at least one portion 713 each having a bend, preferably at least two portions 713 and 715 each having a bend (e.g., forming an "S" shape). Other passageways 710a in the same burner body 700 may be straight (e.g., lacking one or more bends). In some embodiments, a separate connector 790b may be provided configured to supply one or more components to the passageways 710b, such as at least one component that is different from the fuel and oxidizer supplied to the passageways 710a through the connector 790a. In certain embodiments, the burner body includes a curve or a stepped shape 760 on a surface normal to the first major surface 720. The ability to provide one or more bends in a passageway and/or one or more curves or stepped shapes provides additional design freedom for exemplary burner bodies according to the present disclosure.

Figure 8:
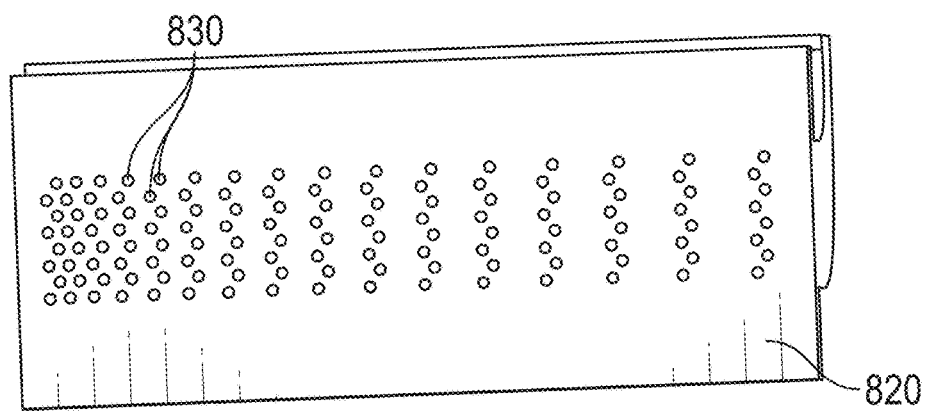
FIG. 8 is a schematic perspective view of an exemplary burner body including an asymmetrical pattern of ports, preparable according to the present disclosure.
Figure 11A:
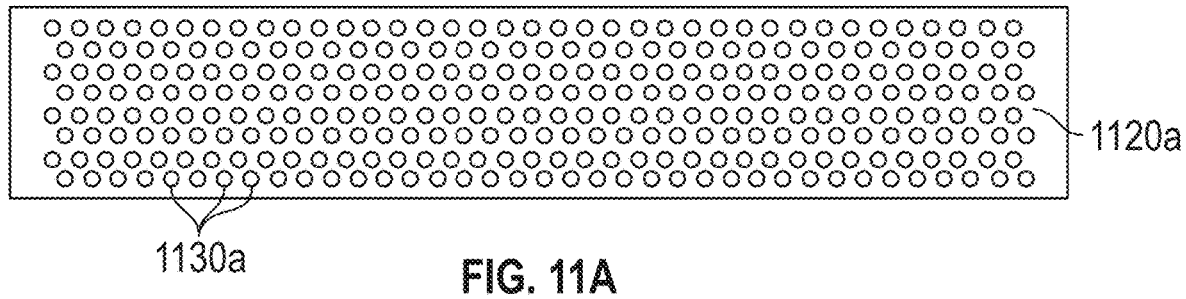
FIG. 11A is a top view of an exemplary port structure of a burner body, preparable according to the present disclosure.
Figure 11B:
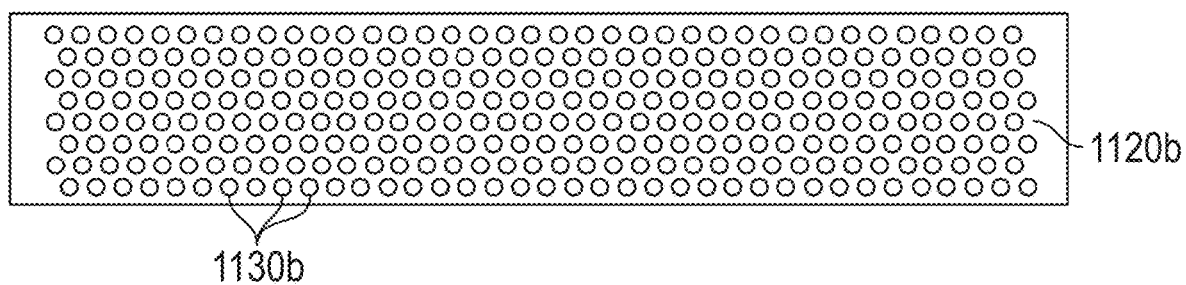
FIG. 11B is a top view of another exemplary port structure of a burner body, preparable according to the present disclosure.
Figure 11C:
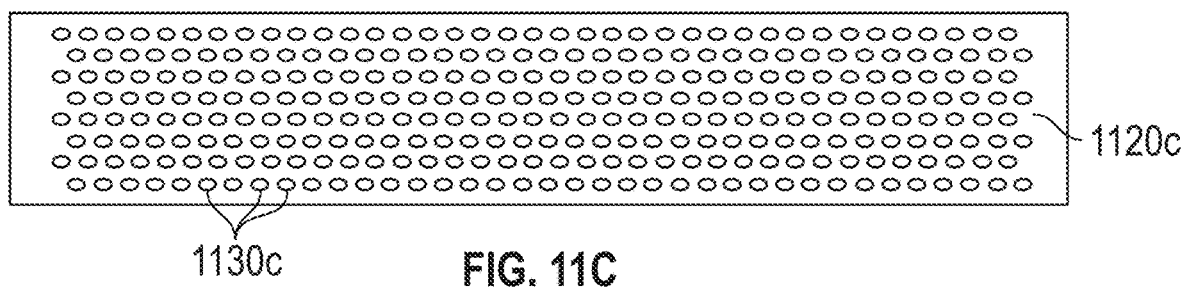
FIG. 11C is a top view of an additional exemplary port structure of a burner body, preparable according to the present disclosure.

The design of the disposition of the plurality of ports on the first major surface of the burner body is not particularly limited. In some embodiments, the location of the ports forms a pattern. Referring to FIGS. 11A-11C, in select embodiments, a pattern of the plurality of ports at the first major surface is symmetrical. Referring to FIG. 8, in other embodiments, a pattern of the plurality of ports 830 at the first major surface 820 is asymmetrical. One example pattern, as shown in FIG. 8, could include a higher density of ports in at least one location in which greater flame treatment (e.g., perforation) of a substrate is desired, and a lower density of ports in at least one location in which less flame treatment of the substrate is desired.

Figure 9A:
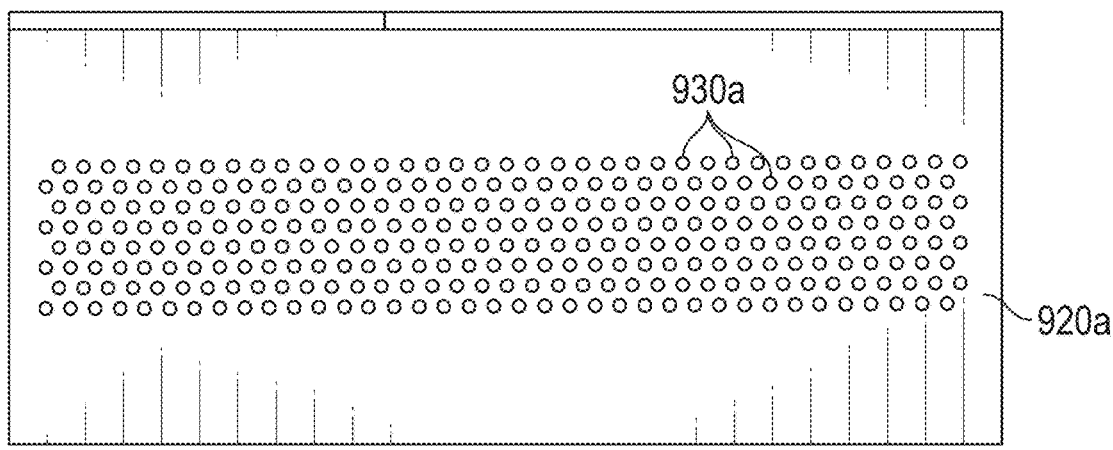
FIG. 9A is a schematic top view of an exemplary burner body including ports having a rounded rectangular shape, preparable according to the present disclosure.
Figure 9B:
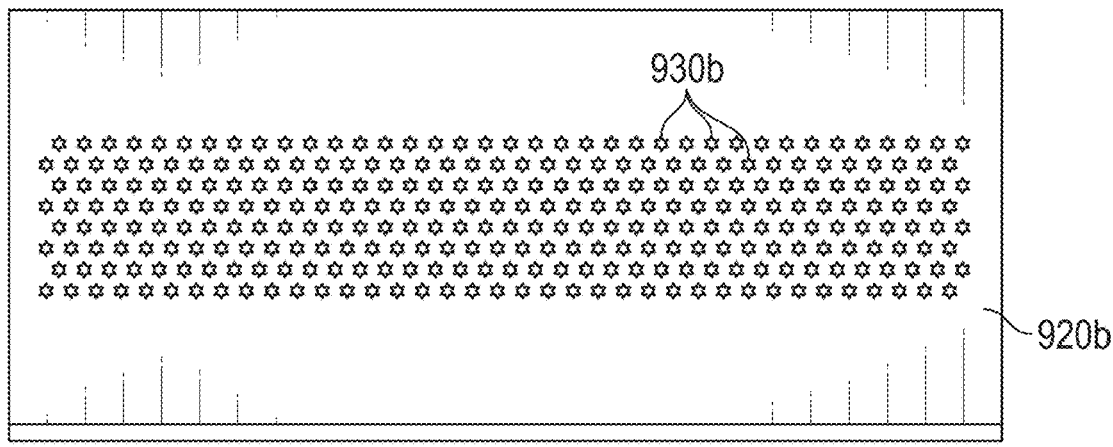
FIG. 9B is a schematic top view of an exemplary burner body including ports having a star shape, preparable according to the present disclosure.
Figure 9C:
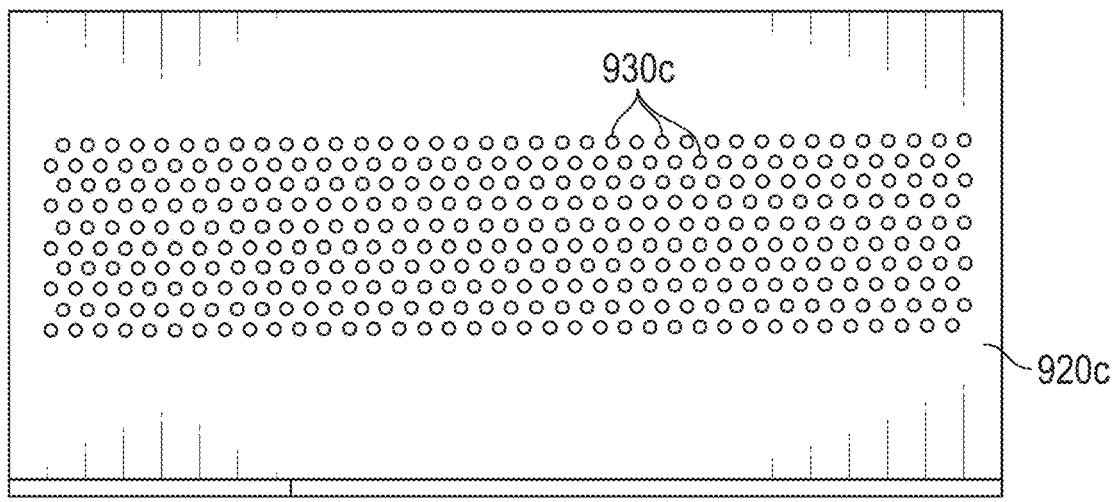
FIG. 9C is a schematic top view of an exemplary burner body including 10 rows of ports, preparable according to the present disclosure

Typically, the first major surface of the burner body includes 2 or more rows of ports, 3, 4, 5, 6, 7, 8, 9, or 10 or more rows of ports, and preferably more than 8 rows of ports. For instance, FIG. 9C is a schematic top view of an exemplary burner body including 10 rows of ports. The number of rows of ports govern the maximum flame power at which stable flames are anchored on the ports. At higher powers than the said maximum flame power, the flames are unstable and lift-off from the burner surface. For example, maximum flame power for a ribbon burner with six rows of ports is 15,000 BTU/hr-in. of burner length (along the main axis of the ribbons); whereas the maximum flame power for a ribbon burner with eight rows of ports is 20,000 BTU/hr-in. of burner length. Operating at higher flame powers allows faster processing speeds for the flame treatments. The ribbon burner designs with more than eight rows of ports are not usable at high powers (>20,000 BTU/hr-in.) because at these powers, the passageways connected to the middle ports get overheated, which results in uneven port structure within different rows of the ports. In contrast, in the case of certain embodiments according to the present disclosure, because of the cooling chamber surrounding the passageways, the overheating of the middle passageways could be avoided, thus allowing the use of burners with more than eight rows of ports.

Figure 10:
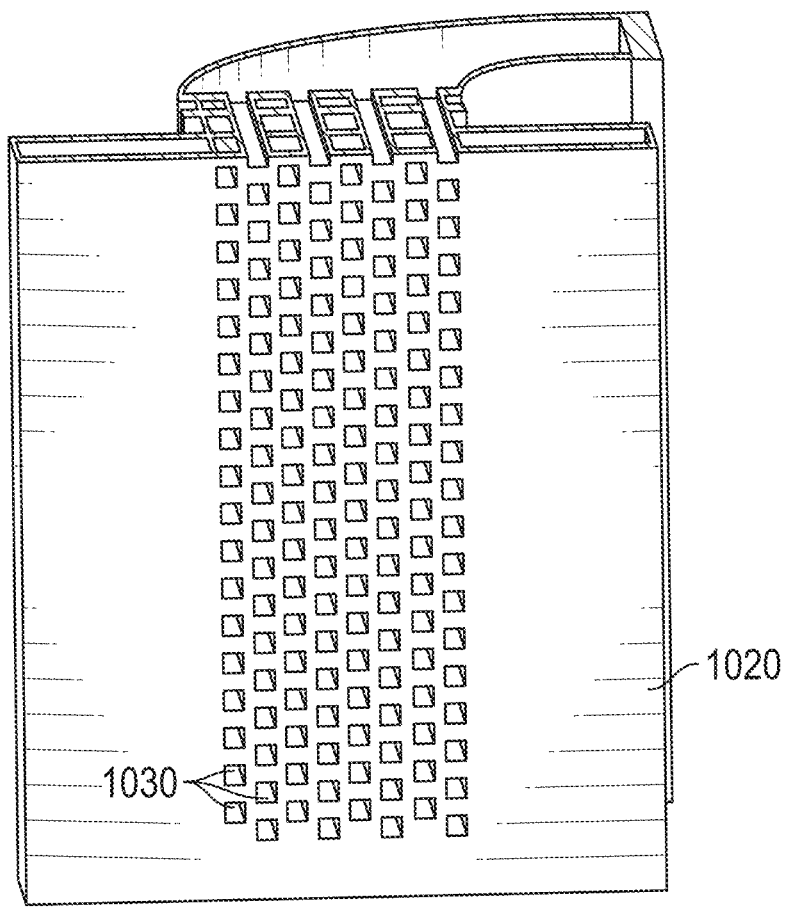
FIG. 10 is a schematic top view of an exemplary burner body including ports having a square shape, preparable according to the present disclosure.

The shape of each of the ports is not particularly limited, due to the design flexibility of additive manufacturing. Any shape that is capable of anchoring a flame is contemplated. For example, referring to FIGS. 8-10, and 11A-11C, in some embodiments, one or more ports each has a circular shape (FIGS. 8, 9C, 11A, and 11B), an elliptical shape (FIG. 11C, a rectangular shape (e.g., a square, FIG. 10), a rounded rectangular shape (FIG. 9A), or a star shape (FIG. 9B). Moreover, in certain embodiments a passageway that ends in a port may have the same shape as the port (e.g., a passageway may have a cross-sectional geometry of a rounded rectangle and end in a port having the shape of a rounded rectangle). Any combination of these shapes may be employed for one burner body. In a ribbon burner, however, typically elliptical-shaped ports are readily employed.

In some embodiments, the passageways each have a length and a diameter, in which the diameter is constant throughout the length of each of the passageways. A constant diameter may be useful, for instance, when a particulate material is included in a gas (or gas mixture) and flowed through a passageway.

Burners according to the present disclosure are designed to support a flame, thus in use will pass at least a fuel and an oxidizer through the passageways to form the flame(s). Suitable fuels include, for instance and without limitation, propane, natural gas, and hydrogen. Suitable oxidizers include, for instance and without limitation, air and oxygen. The location(s) of these and other materials for use in the burner are not particularly limited. For example, in some embodiments, a mixture of at least fuel and oxidizer is disposed within a first passageway, and the mixture flows through the first passageway to a first port. In some embodiments, a fuel is disposed within a first passageway and an oxidizer is disposed within a second passageway, and the fuel flows through the first passageway to a first port and the oxidizer flows through the second passageway to a second port.

Figure 4:
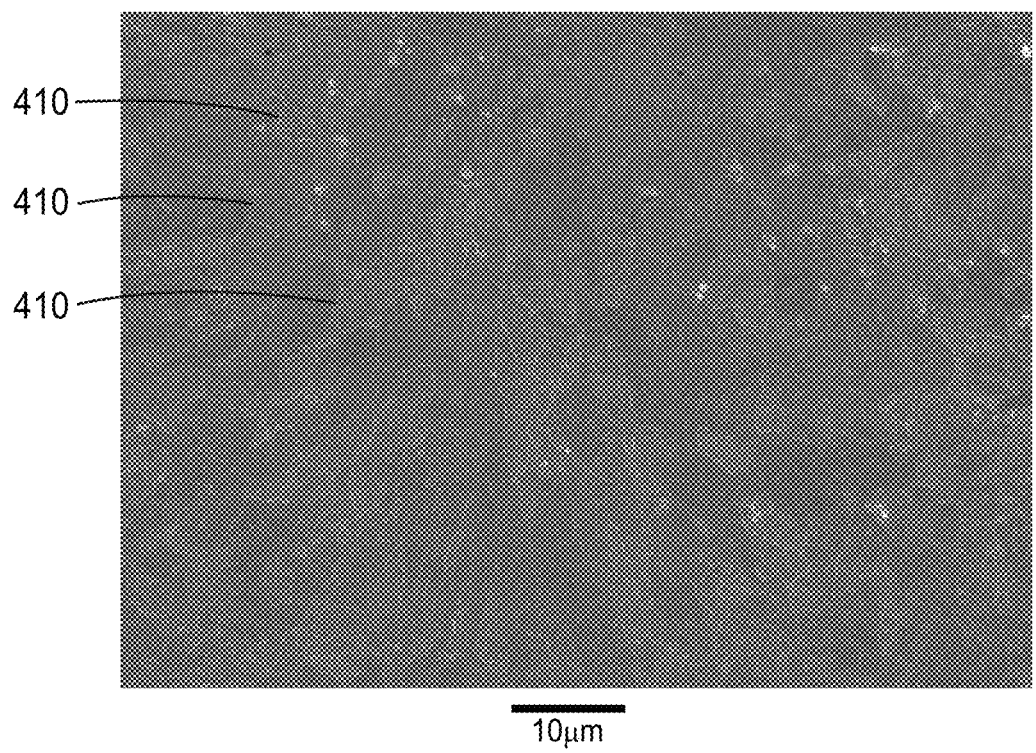
FIG. 4 is an SEM image using secondary electron imaging of an interior portion of a burner body according to the present disclosure.
Figure 5:
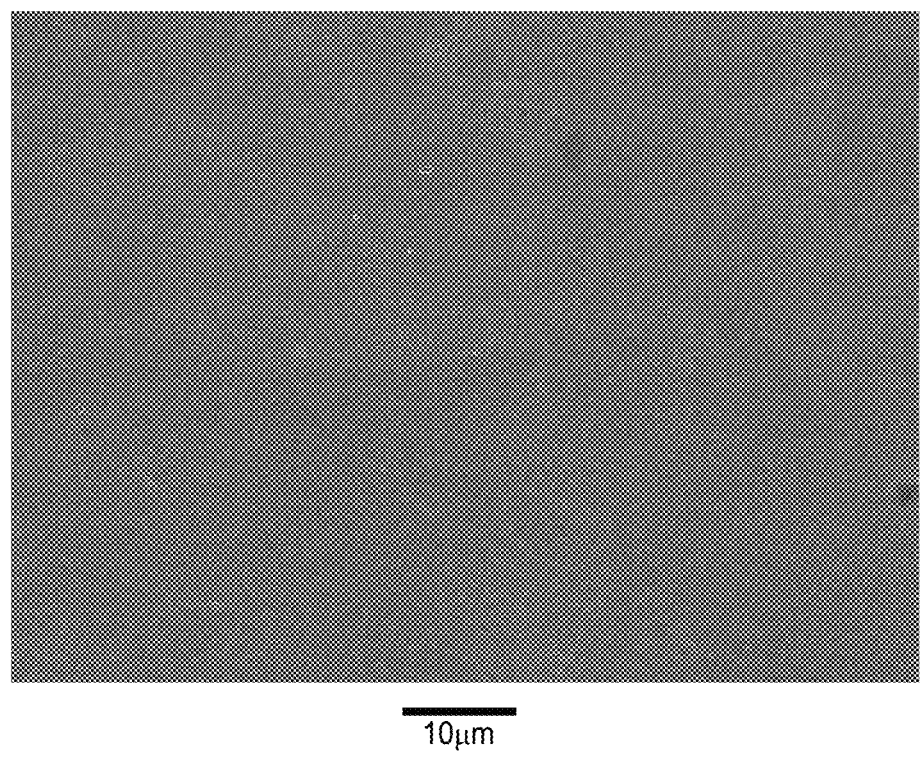
FIG. 5 is an SEM image of an interior portion of a burner body according to prior art.

In certain embodiments, a non-combustible and/or non-oxidizer component is disposed within a third passageway, and the non-combustible component flows through the third passageway to a third port. In select embodiments, a non-oxidizer and/or non-combustible component is disposed within the first passageway, the second passageway, or both. Suitable non-combustible components include, for instance and without limitation, ceramic materials, gases such as nitrogen, argon, and chlorine, and metalloorganic materials. Suitable non-oxidizer components include, for instance and without limitation, catalysts, $NH_3$ gas, organic vapors, hydrocarbons, and metals. Certain components are both non-combustible and non-oxidizer components, such as ceramics, metal oxides, and gases such as nitrogen, argon, helium. wherein the burner body comprises a plurality of layers of metal directly bonded to each other The burner body comprising plurality of metal layers formed using additive manufacturing (e.g., in a layer by layer manner), is indicated by the formation of a "scalloping" artefact. Referring to FIG. 4, a portion of a metal burner is shown in a scanning election microscope image at a magnification of 1,500×. The metal burner was broken perpendicular to the additive manufacturing build layers, and the irregular (e.g., generally oblong) outlines 410 in the image are the scalloping artefacts. This scalloping is in contrast to metal ribbon burners made by traditional methods, e.g., formed of stacks of corrugated metal. For instance, FIG. 5 is an SEM image at 1,500× magnification of a metal ribbon burner broken in a direction 90 degrees turned from the direction the metal burner in FIG. 4 was broken. No scalloping is present in the ribbon burner.

Without wishing to be bound by theory, it is believed that during layer by layer additive manufacturing of a metal burner from metallic particles, heat from the focused beam melts some of the metallic particles forming a molten pool, which transfers some of its heat to solid metal directly underneath the molten pool and melts some of the solid metal below it, thereby creating interlayer adhesion. When the molten pool solidifies, metal grains solidify in a certain orientation, which can differ grain to grain. The varying orientations can appear as scalloping. In contrast to formation by additive manufacturing, when a metal ingot, having been cast and solidified uniformly from a melt, is rolled into sheets and then stamped into a corrugated shape, the grain structure is much more uniform, and there do not exist any artefacts indicating that different regions of the metal solidified from the melt at different times.

Advantageously, methods according to the present disclosure are suitable for manufacturing various metal burner bodies that cannot be readily or easily fabricated by other methods. For example, inclusion of internal voids is possible as long as an opening to the exterior of the burner body exists for removal of unbonded loose powder. Accordingly, cooling chambers having tortuous and or arcuate paths can be readily manufactured using methods of the present disclosure. Cooling chambers are open to the exterior of the burner body. In some embodiments, they have a single opening, but more typically they have two or more openings. A cooling medium (e.g., air, water or fluid) circulates through the cooling chamber(s) to remove heat generated during use of the burner.

Methods of making a metal burner body according to the present disclosure include a common additive subprocess. The subprocess comprises sequentially, preferably consecutively (although not required) carrying out at least three steps. Thus, in a second aspect, a method of making a metal burner body is provided. The method includes sequential steps:
    a) a subprocess comprising sequentially:
        i) depositing a layer of loose powder particles in a region, wherein the loose powder particles comprise metallic particles and wherein the layer of loose powder particles has substantially uniform thickness;
        ii) selectively treating an area of the layer of loose powder particles with irradiation by a focused beam to bond metallic particles together;
    b) independently carrying out step a) a plurality of times to generate a burner body comprising the bonded powder particles and remaining loose powder particles, wherein in each step a), the loose powder particles are independently selected; and
    c) separating substantially all of the remaining loose powder particles from the burner body.

Moreover, the method optionally further comprises d) post-processing the burner body, such as with a heat treatment. Many heat treatment options would be suitable, for instance and without limitation: heating the burner body to 1100° C., holding for 1 hour, then furnace cooling the burner body back down to room temperature or using a hot isostatic pressing operation.

Figure 6:
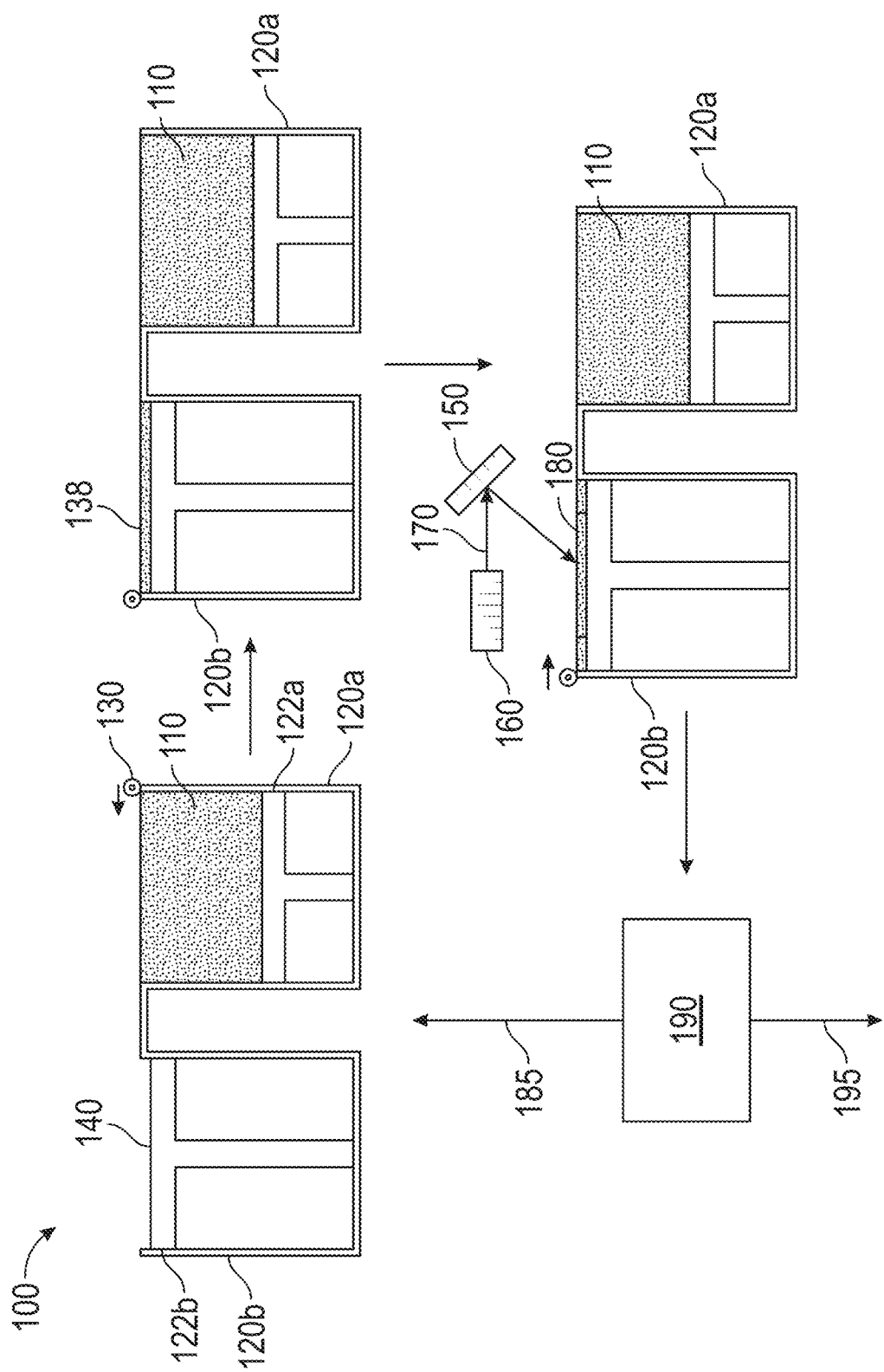
FIG. 6 is a schematic process flow diagram of a method of making a burner body according to the present disclosure.

FIG. 6 schematically depicts an exemplary additive manufacturing process 100 used in making a metal burner body. In the first step, a layer 138 of loose powder particles 110 from powder chamber 120a with movable piston 122a is deposited in a region 140 in powder chamber 120b with movable piston 122b. In certain embodiments, the loose powder particles comprise metallic particles. In the embodiment depicted in FIG. 6, the region is a confined region, but it is not necessary for the loose powder particles to be disposed in a confined region. For instance, a mound of loose powder particles may be placed in a region larger in area than that of the mound of particles.

The layer 138 should be of substantially uniform thickness. For example, the thickness of the layer may vary, such as 50 micrometers or less, 40 micrometers or less, 30 micrometers or less, 20 micrometers or less, or 10 micrometers μm or less. The layers may have any thickness up to about 200 micrometers, as long as the focused beam can bind all the loose powder where it is applied. Preferably, the thickness of the layer is from about 10 micrometers to about 200 micrometers, more preferably about 10 micrometers to about 50 micrometers, 10 μm to about 40 μm, or 10 micrometers to 30 micrometers.

In order to achieve fine resolution, the loose powder particles are preferably sized (e.g., by screening) to have a maximum size of 400 micrometers or less, preferably 250 micrometers or less, more preferably 200 micrometers or less, more preferably 150 micrometers or less, 100 micrometers or less, or even 80 micrometers or less, although larger sizes may also be used. A suitable minimum size is 10 micrometers, 20 micrometers, or 30 micrometers. The metallic particles and any optional additional particulate components may have the same or different maximum particle sizes, $D_{90}$, $D_{50}$, and/or $D_{10}$ particle size distribution parameters.

Methods of improving the powders include agglomeration, spray drying, gas or water atomization, flame forming, granulation, milling, and sieving.

Next, a focused beam 170 is directed onto the predetermined region(s) 180 of layer 138. Typically, the focused beam 170 is provided by coupling an energy source 160 with a mirror 150. In certain embodiments, the mirror 150 is a galvo mirror scanner. Both lasers and e-beam sources are capable of emitting a beam of energy. Suitable energy sources 160 include for instance and without limitation, fiber lasers, $CO_2$ lasers, disk lasers, and solid state lasers, and a suitable e-beam (e.g., electron beam) is available under the trade designations Arcam Q10plus, Arcam Q20plus, and Arcam A2 (Arcam AB, Molndal, Sweden).

Referring again to FIG. 6, the focused beam 170 (step 190) bonds together the loose powder particles in at least one predetermined region of the loose powder particles to form a layer of bonded powder particles; for example, by selective metal sintering or selective laser melting of the metallic particles.

The above steps are then repeated (step 185) with changes to the region where the beam is focused according to a predetermined design resulting through repetition, layer on layer, in a three-dimensional (3-D) article. In each repetition, the loose powder particles may be independently selected; that is, the loose powder particles may be the same as, or different from those in adjacent deposited layers.

Additive manufacturing equipment suitable for practicing the present disclosure is commercially available, for example, from ReaLizer GmbH (Borchen, Germany), from EOS GmbH Electro Optical Systems (Krailling, Germany), or from 3D Systems (Rock Hill, SC), or from Trumpf (Ditzingen, Germany).

The burner body comprises the bonded powder particles and remaining loose powder particles and any support structures necessary to provide mechanical and/or thermal support to the burner body as it is being manufactured. Once sufficient repetitions have been carried out to form the burner body, it is preferably removed from the additive manufacturing equipment and preferably separated from substantially all (e.g., at least 85 percent, at least 90 percent, preferably at least 95 percent, and more preferably at least 99 percent) of the remaining loose powder particles.

If desired, multiple particle reservoirs each containing a different powder may be used. Likewise, multiple different focused beams may be used, either from a common energy source or, preferably, through separate energy sources. The method can advantageously provide a useful metal burner body that does not require further processing.

In some embodiments, a (e.g., non-transitory) machine-readable medium is employed in additive manufacturing of burner bodies according to at least certain aspects of the present disclosure. Data is typically stored on the machine-readable medium. The data represents a three-dimensional model of a burner body or a series of two dimensional models, which when layered on top of one another comprise a three-dimensional model, which can be accessed by at least one computer processor interfacing with additive manufacturing equipment (e.g., a 3D printer, a manufacturing device, etc.). The data is used to cause the additive manufacturing equipment to create the burner body. As used herein, the term "three-dimensional model" refers to both one model having three dimensions and two or more models each having two dimensions, which stacked on top of each other provide a three-dimensional model.

Data representing a burner body may be generated using computer modeling, such as computer aided design (CAD) data. Image data representing the burner body design can be exported in STL format, or in any other suitable computer processable format, to the additive manufacturing equipment. Scanning methods to scan a three-dimensional object may also be employed to create the data representing the burner body. One exemplary technique for acquiring the data is digital scanning Any other suitable scanning technique may be used for scanning an article, including X-ray radiography, laser scanning, computed tomography (CT), magnetic resonance imaging (MRI), and ultrasound imaging. Other possible scanning methods are described, e.g., in U.S. Patent Application Publication No. 2007/0031791 (Cinader, Jr., et al.). The initial digital data set, which may include both raw data from scanning operations and data representing articles derived from the raw data, can be processed to segment a burner body design from any surrounding structures (e.g., a support for the burner body).

Often, machine-readable media are provided as part of a computing device. The computing device may have one or more processors, volatile memory (RAM), a device for reading machine-readable media, and input/output devices, such as a display, a keyboard, and a pointing device. Further, a computing device may also include other software, firmware, or combinations thereof, such as an operating system and other application software. A computing device may be, for example, a workstation, a laptop, a personal digital assistant (PDA), a server, a mainframe or any other general-purpose or application-specific computing device. A computing device may read executable software instructions from a computer-readable medium (such as a hard drive, a CD-ROM, or a computer memory), or may receive instructions from another source logically connected to computer, such as another networked computer.

Figure 16:
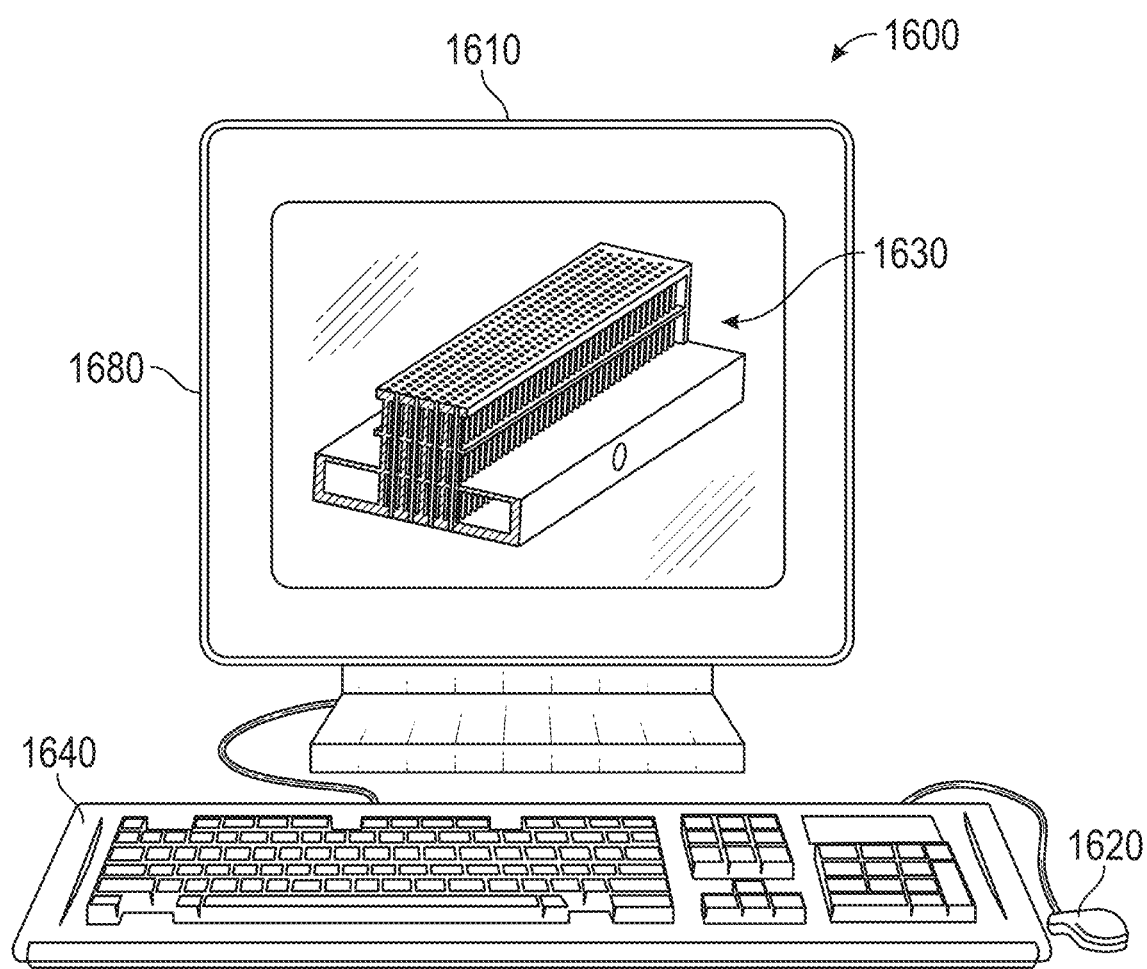
FIG. 16 is a schematic front view of an exemplary computing device 1600.

Referring to FIG. 16, a computing device 1600 often includes an internal processor 1680, a display 1610 (e.g., a monitor), and one or more input devices such as a keyboard 1640 and a mouse 1620. In FIG. 16, a burner body 1630 is shown on the display 1610.

Figure 12:
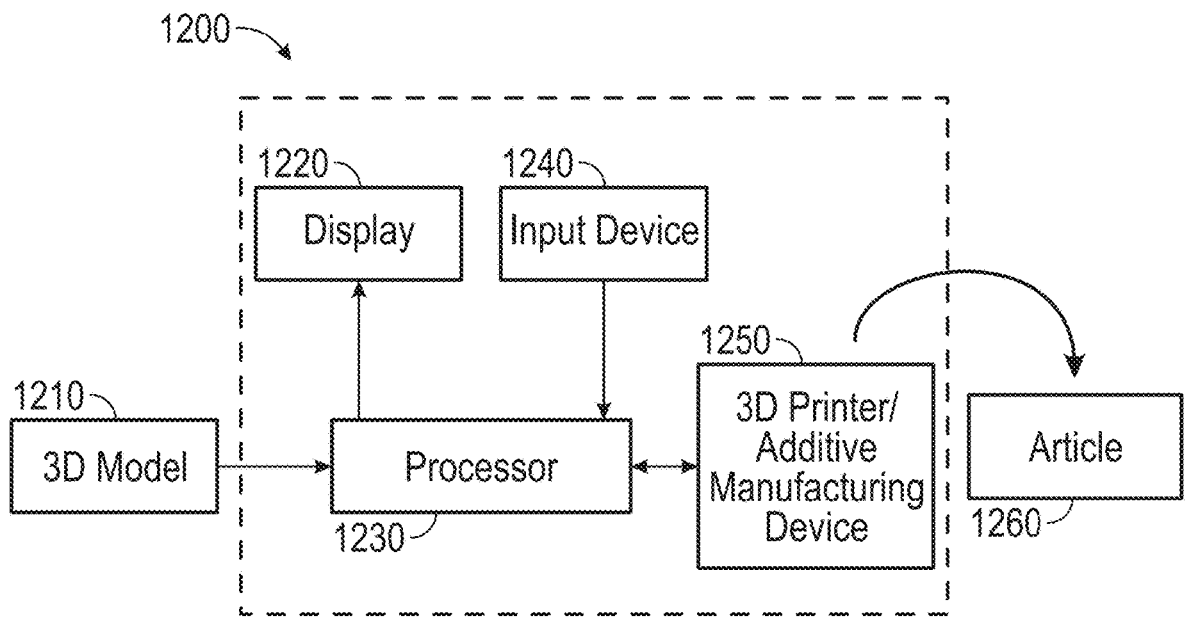
FIG. 12 is a block diagram of a generalized system 1200 for additive manufacturing of an article.

Referring to FIG. 12, in certain embodiments, the present disclosure provides a system 1200. The system 1200 comprises a display 1220 that displays a 3D model 1210 of an article (e.g., a burner body 1230 as shown on the display 1210 of FIG. 16); and one or more processors 1230 that, in response to the 3D model 1210 selected by a user, cause a 3D printer/additive manufacturing device 1250 to create a physical object of the article 1260. Often, an input device 1240 e.g., keyboard and/or mouse) is employed with the display 1220 and the at least one processor 1230, particularly for the user to select the 3D model 1210. The burner body 1260 comprises (1) a plurality of passageways; (2) a first major surface; (3) a plurality of ports at the first major surface, each port defined by an end of one of the passageways; and either: (4a) at least one heating element in or adjacent to at least one of the plurality of passageways that increases the temperature of a wall of the at least one of the plurality of passageways; or (4b) a cooling chamber directly adjacent to three or more of the plurality of passageways. The burner body comprises a number of layers of metal directly bonded to each other.

Figure 13:
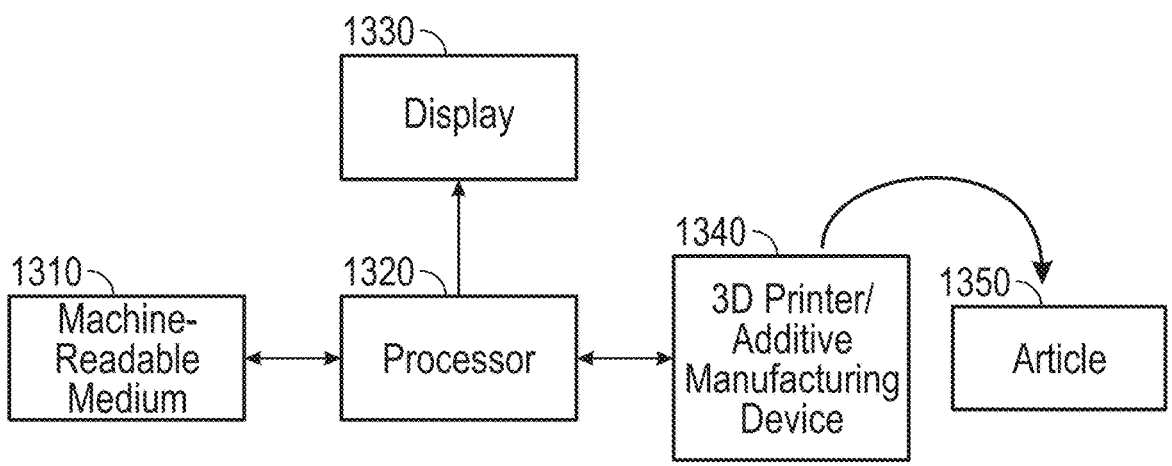
FIG. 13 is a block diagram of a generalized manufacturing process for an article.

Referring to FIG. 13, a processor 1320 (or more than one processor) is in communication with each of a machine-readable medium 1310 (e.g., a non-transitory medium), a 3D printer/additive manufacturing device 1340, and optionally a display 1330 for viewing by a user. The 3D printer/additive manufacturing device 1340 is configured to make one or more articles 1350 based on instructions from the processor 1320 providing data representing a 3D model of the article 1350 (i.e., a burner body, such as a burner body 1330 as shown on the display 1310 of FIG. 16) from the machine-readable medium 1310.

Referring to FIG. 14, for example and without limitation, an additive manufacturing method comprises retrieving 1410, from a (e.g., non-transitory) machine-readable medium, data representing a 3D model of an article according to at least one embodiment of the present disclosure (i.e., a burner body). The method further includes executing 1420, by one or more processors, an additive manufacturing application interfacing with a manufacturing device using the data; and generating 1430, by the manufacturing device, a physical object of the article. One or more various optional post-processing steps 1440 may be undertaken, for instance and without limitation, support removal, heat treatment, polishing, and threading of pilot holes. For example and without limitation, an additive manufacturing method comprises retrieving, from a (e.g., non-transitory) machine-readable medium, data representing a 3D model of a burner body according to at least one embodiment of the present disclosure. The method further comprises executing, by one or more processors, an additive manufacturing application interfacing with a manufacturing device using the data; and generating, by the manufacturing device, a physical object of the burner body. The additive manufacturing equipment can selectively bond the powder particles (e.g., metallic particles) according to a set of computerized design instructions to create the desired burner body.

In certain embodiments, a method of making a burner body is provided. The method comprises receiving, by a manufacturing device having one or more processors, a digital object comprising data specifying a plurality of layers of a burner body; and generating, with the manufacturing device by an additive manufacturing process, the burner body based on the digital object. The burner body comprises (1) a plurality of passageways; (2) a first major surface; (3) a plurality of ports at the first major surface, each port defined by an end of one of the passageways; and either: (4a) at least one heating element in or adjacent to at least one of the plurality of passageways that increases the temperature of a wall of the at least one of the plurality of passageways; or (4b) a cooling chamber directly adjacent to three or more of the plurality of passageways. The burner body comprises a number of layers of metal directly bonded to each other.

Additionally, referring to FIG. 15, a method of making an article (i.e., a burner body) comprises receiving 1510, by a manufacturing device having one or more processors, a digital object comprising data specifying a plurality of layers of an article; and generating 1520, with the manufacturing device by an additive manufacturing process, the article based on the digital object. Again, the article may undergo one or more steps of post-processing 1530.

SELECT EMBODIMENTS OF THE PRESENT DISCLOSURE

Embodiment 1 is a burner. The burner includes (a) a burner body and (b) at least one connector configured to supply at least a fuel and an oxidizer to the burner body. The burner body includes (1) a plurality of passageways; (2) a first major surface; (3) a plurality of ports at the first major surface, each port defined by an end of one of the passageways; and either: (4a) at least one heating element in or adjacent to at least one of the plurality of passageways that increases the temperature of a wall of the at least one of the plurality of passageways; or (4b) a cooling chamber directly adjacent to three or more of the plurality of passageways. The burner body includes a number of layers of metal directly bonded to each other.

Embodiment 2 is the burner of embodiment 1, wherein the burner body includes a plurality of columns of grains of metal.

Embodiment 3 is the burner of embodiment 1 or embodiment 2, wherein the cooling chamber is present and is located closer to the first major surface of the burner body than to an opposing major surface of the burner body.

Embodiment 4 is the burner of any of embodiments 1 to 3, wherein the cooling chamber is present and surrounds three or more of the plurality of passageways.

Embodiment 5 is the burner of any of embodiments 1 to 4, wherein the first major surface includes 2 or more rows of ports, preferably more than 8 rows of ports.

Embodiment 6 is the burner of any of embodiments 1 to 5, wherein at least one of the plurality of passageways includes at least one portion each having a bend, preferably at least two portions each having a bend.

Embodiment 7 is the burner of any of embodiments 1 to 6, wherein the burner body includes a curve or a stepped shape on a surface normal to the first major surface.

Embodiment 8 is the burner of any of embodiments 1 to 7, wherein a pattern of the plurality of ports at the first major surface is symmetrical.

Embodiment 9 is the burner of any of embodiments 1 to 8, wherein a pattern of the plurality of ports at the first major surface is asymmetrical.

Embodiment 10 is the burner of any of embodiments 1 to 9, wherein the metal includes steel or a nickel alloy, preferably a nickel chromium alloy.

Embodiment 11 is the burner of any of embodiments 1 to 10, wherein the at least one heating element is present and includes a metal, a ceramic, or a heating fluid.

Embodiment 12 is the burner of any of embodiments 1 to 11, wherein the at least one heating element is present and includes a metal having a different thermal conductivity than the wall of the at least one of the plurality of passageways.

Embodiment 13 is the burner of any of embodiments 1 to 12, wherein the at least one heating element is present and is directly attached to the wall of the at least one of the plurality of passageways.

Embodiment 14 is the burner of any of embodiments 1 to 13, wherein at least one of the plurality of ports has a circular shape.

Embodiment 15 is the burner of any of embodiments 1 to 14, wherein at least one of the plurality of ports has an elliptical shape.

Embodiment 16 is the burner of any of embodiments 1 to 15, wherein at least one of the plurality of ports has a shape selected from a rectangular shape, a rounded rectangular shape, or a star shape.

Embodiment 17 is the burner of any of embodiments 1 to 16, wherein the plurality of passageways has a length and a diameter, wherein the diameter is constant throughout the length of each of the plurality of passageways.

Embodiment 18 is the burner of any of embodiments 1 to 17, further including a mixture of at least fuel and oxidizer disposed within a first passageway, and wherein the mixture flows through the first passageway to a first port.

Embodiment 19 is the burner of any of embodiments 1 to 18, further including a fuel disposed within a first passageway and an oxidizer disposed within a second passageway, wherein the fuel flows through the first passageway to a first port and wherein the oxidizer flows through the second passageway to a second port.

Embodiment 20 is the burner of any of embodiments 1 to 19, further including a non-combustible and/or non-oxidizer component disposed within a third passageway, wherein the non-combustible component flows through the third passageway to a third port.

Embodiment 21 is the burner of any of embodiments 1 to 20, further including a non-oxidizer and/or non-combustible component disposed within the first passageway, the second passageway, or both.

Embodiment 22 is a method of making a burner body of any of embodiments 1 to 21. The method includes sequential steps, including (a) a subprocess including sequentially: (i) depositing a layer of loose powder particles in a region, wherein the loose powder particles include metallic particles and wherein the layer of loose powder particles has substantially uniform thickness; and (ii) selectively treating an area of the layer of loose powder particles with irradiation by a focused beam to bond metallic particles together. The method further includes (b) independently carrying out step (a) a plurality of times to generate a burner body including the bonded powder particles and remaining loose powder particles, wherein in each step (a), the loose powder particles are independently selected. The method also includes (c) separating substantially all of the remaining loose powder particles from the burner body.

Embodiment 23 is the method of embodiment 22, wherein the metallic particles include steel or a nickel alloy, preferably a nickel chromium alloy, more preferably a nickel chromium iron alloy.

Embodiment 24 is a non-transitory machine-readable medium. The non-transitory medium has data representing a three-dimensional model of a burner body, when accessed by one or more processors interfacing with a 3D printer, cause the 3D printer to create the burner body. The burner body includes (1) a plurality of passageways; (2) a first major surface; (3) a plurality of ports at the first major surface, each port defined by an end of one of the passageways; and either: (4a) at least one heating element in or adjacent to at least one of the plurality of passageways that increases the temperature of a wall of the at least one of the plurality of passageways; or (4b) a cooling chamber directly adjacent to three or more of the plurality of passageways. The burner body includes a number of layers of metal directly bonded to each other.

Embodiment 25 is a method. The method includes (a) retrieving, from a non-transitory machine-readable medium, data representing a 3D model of a burner body; (b) executing, by one or more processors, a 3D printing application interfacing with a manufacturing device using the data; and (c) generating, by the manufacturing device, a physical object of the burner body. The burner body includes (1) a plurality of passageways; (2) a first major surface; (3) a plurality of ports at the first major surface, each port defined by an end of one of the passageways; and either: (4a) at least one heating element in or adjacent to at least one of the plurality of passageways that increases the temperature of a wall of the at least one of the plurality of passageways; or (4b) a cooling chamber directly adjacent to three or more of the plurality of passageways. The burner body includes a number of layers of metal directly bonded to each other.

Embodiment 26 is a burner body generated using the method of embodiment 25.

Embodiment 27 is a method of forming a burner body. The method includes (a) receiving, by a manufacturing device having one or more processors, a digital object comprising data specifying a plurality of layers of a burner body; and (b) generating, with the manufacturing device by an additive manufacturing process, the burner body based on the digital object. The burner body includes (1) a plurality of passageways; (2) a first major surface; (3) a plurality of ports at the first major surface, each port defined by an end of one of the passageways; and either: (4a) at least one heating element in or adjacent to at least one of the plurality of passageways that increases the temperature of a wall of the at least one of the plurality of passageways; or (4b) a cooling chamber directly adjacent to three or more of the plurality of passageways. The burner body includes a number of layers of metal directly bonded to each other.

Embodiment 28 is the method of embodiment 27, wherein the additive manufacturing process includes sequential steps including (a) a subprocess including sequentially: (i) depositing a layer of loose powder particles in a region, wherein the loose powder particles include metallic particles and wherein the layer of loose powder particles has substantially uniform thickness; and (ii) selectively treating an area of the layer of loose powder particles with irradiation by a focused beam to bond metallic particles together. The method further includes (b) independently carrying out step (a) a plurality of times to generate a burner body comprising the bonded powder particles and remaining loose powder particles, wherein in each step (a), the loose powder particles are independently selected. The method also includes (c) separating substantially all of the remaining loose powder particles from the burner body.

Embodiment 29 is the method of embodiment 28, further including c) separating substantially all of the remaining loose powder particles from the burner body.

Embodiment 30 is a system. The system includes (a) a display that displays a 3D model of a burner body; and (b) one or more processors that, in response to the 3D model selected by a user, cause a 3D printer to create a physical object of the burner body. The burner body includes (1) a plurality of passageways; (2) a first major surface; (3) a plurality of ports at the first major surface, each port defined by an end of one of the passageways; and either: (4a) at least one heating element in or adjacent to at least one of the plurality of passageways that increases the temperature of a wall of the at least one of the plurality of passageways; or (4b) a cooling chamber directly adjacent to three or more of the plurality of passageways. The burner body includes a number of layers of metal directly bonded to each other.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted or apparent from the context, all parts, percentages, ratios, etc. in the Examples and the rest of the specification are by weight. In the Examples: ° C.=degrees Celsius, g=grams, min=minute, mm=millimeter, and rpm=revolutions per minute.

EXAMPLES

Equations $$\text{Burner power}\left(\frac{\text{BTU}}{\text{hr-inch}}\right) = \frac{\text{fuel volume burned}\left(\frac{\text{ft}^3}{\text{hr}}\right) \times \text{heat content of fuel}\left(\frac{\text{BTU}}{\text{ft}^3}\right)}{\text{Length of the burner (inch)}}. \quad \text{Equation 1}$$

$$\text{Equivalence Ratio } (\phi) = \frac{\left[\frac{\text{oxidizer}}{\text{fuel}}\right]_{stoichiometric}}{\left[\frac{\text{oxidizer}}{\text{fuel}}\right]_{actual}} \quad \text{Equation 2}$$

The burner bodies were prepared from CAD drawings using 17-4 PH stainless steel powder (Sandvik Osprey, Neath, United Kingdom) and a ProX DMP 200 printer (3D printing Systems, Rock Hill, SC). The burner bodies were printed with a 30 micrometer layer height and 50 micrometer hatch spacing using a fiber laser with a 1070 nm wavelength, 2500 mm/second laser speed, and power of 240 W.

Example 1

The printed burner body was in the form of a rectangular frame with top and bottom wall surfaces (external dimensions: 10.3 cm x-direction, 1.9 cm y-direction) and connecting side wall surfaces (external dimensions: 1.9 cm y-direction, 2.2 cm z-direction). The surfaces were about 2 mm thick. The interior of the frame was composed of 296 hollow tubes that served as passageways and terminated in open-hole ports on both the top and bottom surfaces. Each passageway and corresponding port opening had a circular cross-section with an internal diameter of 1.57 mm that was constant throughout the passageway. The thickness of each tube wall was 0.3 mm. The passageways were arranged in a symmetrical pattern of 8 rows with each row containing 37 passageways (spaced along the x-direction). Within each row, the center-to-center spacing of each port in the row was 2.6 mm. The first passageways in adjacent rows were offset by half a spacing so that the corresponding passageways (and ports) in rows 1, 3, 5, and 7 were in linear alignment with each other and the corresponding passageways (and ports) in rows 2, 4, 6, and 8 were in linear alignment with each other. The closest distance (center-to-center) between ports of adjacent rows was 2.1 mm.

The printed burner body was secured in the opening of an aluminum burner manifold that had an internal cavity (dimensions (9.8 cm x-direction, 3.9 cm y-direction, 2.8 cm z-direction) positioned directly below the opening containing the printed burner body. The printed burner body was oriented in the opening so that the ports on the bottom surface faced and were in fluid communication with the internal cavity. The cavity of the manifold was connected to a fuel source through a copper tube fitting (1.9 cm diameter) positioned in a side wall of the manifold. The fuel was propane, supplied in a compressed-gas cylinder. The oxidizer was compressed air. The propane gas and the air flow rate were supplied to the burner using a portable gas controller unit. The propane and air flow rates were adjusted using needle valves and gas flowmeters. Operational conditions for the burner are presented in Table 1.

Example 2

The printed burner body was in the form of a rectangular frame with top and bottom wall surfaces (external dimensions: 10.3 cm x-direction, 1.9 cm y-direction) and connecting side wall surfaces (external dimensions: 2.2 cm z-direction, 1.9 cm y-direction). The surfaces were about 2 mm thick. The interior of the frame was composed of 296 hollow tubes that served as passageways and terminated in open-hole ports on both the top and bottom surfaces. Each passageway and corresponding port opening had a circular cross-section with an internal diameter of 1.31 mm that was constant throughout the passageway. The thickness of each tube wall was 0.3 mm. The passageways were arranged in a symmetrical pattern of 8 rows with each row containing 37 passageways (spaced along the x-direction). Within each row, the center-to-center spacing of each port in the row was 2.6 mm. The first passageways in adjacent rows were offset by half a spacing so that the corresponding passageways (and ports) in rows 1, 3, 5, and 7 were in linear alignment with each other and the corresponding passageways (and ports) in rows 2, 4, 6, and 8 were in linear alignment with each other. The closest distance (center-to-center) between ports of adjacent rows was 2.1 mm.

The printed burner body was secured in the opening of an aluminum burner manifold that had an internal cavity (dimensions: 9.8 cm x-direction, 3.9 cm y-direction, 2.8 cm z-direction) positioned directly below the opening containing the printed burner body. The printed burner body was oriented in the opening so that the ports on the bottom surface faced and were in fluid communication with the internal cavity. The cavity of the manifold was connected to a fuel source through a copper tube fitting (1.9 cm diameter) positioned in a side wall of the manifold. The combustible mixture was supplied in the same manner as in Example 1. Operational conditions for the burner are presented in Table 1.

Example 3

The printed burner body was in the form of a rectangular frame with top and bottom wall surfaces (external dimensions: 10.3 cm x-direction, 1.9 cm y-direction) and connecting side wall surfaces (external dimensions: 2.2 cm z-direction, 1.9 cm y-direction). The surfaces were about 2 mm thick. The interior of the frame was composed of 296 hollow tubes with that served as passageways and terminated in open-hole ports on both the top and bottom surfaces. Each passageway and corresponding port opening had an elliptical shaped cross section (internal dimensions: major axis of 1.64 mm and minor axis of 1.05 mm) that was constant throughout the passageway. The thickness of each tube wall was 0.3 mm. The passageways were arranged in a symmetrical pattern of 8 rows with each row containing 37 passageways (spaced along the x-direction). The ports were oriented to have the major axis of each port aligned in the X-direction. Within each row, the center-to-center spacing of each port in the row was 2.6 mm. The first passageways in adjacent rows were offset by half a spacing so that the corresponding passageways (and ports) in rows 1, 3, 5, and 7 were in linear alignment with each other and the corresponding passageways (and ports) in rows 2, 4, 6, and 8 were in linear alignment with each other. The closest distance (center-to-center) between ports of adjacent rows was 2.1 mm.

The printed burner body was secured in the opening of an aluminum burner manifold that had an internal cavity (dimensions (9.8 cm x-direction, 3.9 cm y-direction, 2.8 cm z-direction) positioned directly below the opening containing the printed burner body. The printed burner body was oriented in the opening so that the ports on the bottom surface faced and were in fluid communication with the internal cavity. The cavity of the manifold was connected to a fuel source through a copper tube fitting (1.9 cm diameter) positioned in a side wall of the manifold. The combustible mixture was supplied in the same manner as in Example 1. Operational conditions for the burner are presented in Table 1.

TABLE 1

| Burner of | Port Shape | Port Dimensions | Burner Power (BTU/hour/inch) | Equivalence Ratio | Flame |
|---|---|---|---|---|---|
| Example 1 | circle | 1.57 mm (diameter) | 4000 | 0.96 | anchored |
| Example 1 | circle | 1.57 mm (diameter) | 7710 | 0.96 | anchored |
| Example 1 | circle | 1.57 mm (diameter) | 9637 | 0.85 | anchored |
| Example 2 | circle | 1.31 mm (diameter) | 4818 | 1.10 | not anchored (unstable) |
| Example 3 | ellipse | 1.64 mm (major axis), 1.05 mm (minor axis) | 5011 | 1.15 | not anchored (unstable) |

Example 4

The printed burner body was in the form of a rectangular frame with top and bottom wall surfaces (external dimensions: 10.3 cm x-direction, 1.9 cm y-direction) and connecting side wall surfaces (external dimensions: 1.9 cm y-direction, 2.2 cm z-direction). The surfaces were about 2 mm thick. The interior of the frame was composed of 296 hollow tubes that served as passageways and terminated in open-hole ports on both the top and bottom surfaces. Each passageway and corresponding port opening had a circular cross-section with an internal diameter of 1.57 mm that was constant throughout the passageway. The thickness of each tube wall was 0.3 mm. The passageways were arranged in a symmetrical pattern of 8 rows with each row containing 37 passageways (spaced along the x-direction). Within each row, the center-to-center spacing of each port in the row was 2.6 mm. The first passageways in adjacent rows were offset by half a spacing so that the corresponding passageways (and ports) in rows 1, 3, 5, and 7 were in linear alignment with each other and the corresponding passageways (and ports) in rows 2, 4, 6, and 8 were in linear alignment with each other. The closest distance (center-to-center) between ports of adjacent rows was 2.1 mm.

The printed burner body was secured in the opening of an aluminum burner manifold that had an internal cavity (dimensions (9.8 cm x-direction, 3.9 cm y-direction, 2.8 cm z-direction) positioned directly below the opening containing the printed burner body. The printed burner body was oriented in the opening so that the ports on the bottom surface faced and were in fluid communication with the internal cavity. The cavity of the manifold was connected to a PYROSIL GVE2 HB silicon dioxide coating device (SURA Instruments GmbH, Jenna, Germany) through a copper tube fitting (1.9 cm diameter) positioned in a side wall of the manifold. The coating device included two pressurized canisters each containing a mixture of PYROSIL silicon-containing precursor material and liquified fuel (SURA Instruments GmbH). The cannisters were attached to a gas flow assembly with on/off valves and pressure gauge. The tube exiting the gas flow assembly was connected to the burner. In operation, a stable flame containing PYROSIL gases was observed.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove.

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A burner comprising:
    a) burner body comprising:
        1) a plurality of passageways;
        2) a first major surface;
        3) a plurality of ports at the first major surface, each port defined by an end of one of the passageways; and
        4) at least one heating element in or adjacent to at least one of the plurality of passageways that increases the temperature of a wall of the at least one of the plurality of passageways, wherein the at least one heating element comprises a heating fluid, wherein the at least one heating element further comprises a structure that increases heat transfer, wherein the structure that increases heat transfer comprises individual posts;
    wherein the burner body comprises a plurality of layers of metal directly bonded to each other; and
    b) at least one connector configured to supply at least a fuel and an oxidizer to the burner body.

2. The burner of claim 1, wherein the heating fluid comprises oil.

3. The burner of claim 1, wherein the burner body comprises a plurality of columns of grains of metal.

4. The burner of claim 1, wherein the first major surface has 8 or more rows of ports.

5. The burner of claim 1, wherein a pattern of the plurality of ports at the first major surface is asymmetrical.

6. The burner of claim 1, wherein the metal comprises steel or a nickel alloy.

7. A method of making a burner body of claim 1, the method comprising sequential steps:
   a) a subprocess comprising sequentially:
      i) depositing a layer of loose powder particles in a region, wherein the loose powder particles comprise metallic particles and wherein the layer of loose powder particles has substantially uniform thickness;
      ii) selectively treating an area of the layer of loose powder particles with irradiation by a focused beam to bond metallic particles together;
   b) independently carrying out step a) a plurality of times to generate a burner body comprising the bonded powder particles and remaining loose powder particles, wherein in each step a), the loose powder particles are independently selected; and
   c) separating substantially all of the remaining loose powder particles from the burner body.

8. A non-transitory machine-readable medium having data representing a three-dimensional model of a burner body, when accessed by one or more processors interfacing with a 3D printer, cause the 3D printer to create the burner body comprising:
   1) a plurality of passageways;
   2) a first major surface;
   3) a plurality of ports at the first major surface, each port defined by an end of one of the passageways; and
   4) at least one heating element in or adjacent to at least one of the plurality of passageways that increases the temperature of a wall of the at least one of the plurality of passageways, wherein the at least one heating element comprises a heating fluid, wherein the at least one heating element further comprises a structure that increases heat transfer, wherein the structure that increases heat transfer comprises individual posts;
   wherein the burner body comprises a plurality of layers of metal directly bonded to each other.

9. A method, comprising:
   retrieving, from a non-transitory machine-readable medium, data representing a 3D model of a burner body, the burner body comprising:
   1) a plurality of passageways;
   2) a first major surface;
   3) a plurality of ports at the first major surface, each port defined by an end of one of the passageways; and
   4) at least one heating element in or adjacent to at least one of the plurality of passageways that increases the temperature of a wall of the at least one of the plurality of passageways, wherein the at least one heating element comprises a heating fluid, wherein the at least one heating element further comprises a structure that increases heat transfer, wherein the structure that increases heat transfer comprises individual posts;
   wherein the burner body comprises a plurality of layers of metal directly bonded to each other;
   executing, by one or more processors, a 3D printing application interfacing with a manufacturing device using the data; and
   generating, by the manufacturing device, a physical object of the burner body.

10. A burner body generated using the method of claim 9.

11. A method of forming a burner body, the method comprising:
   receiving, by a manufacturing device having one or more processors, a digital object comprising data specifying a plurality of layers of a burner body, the burner body comprising:
   1) a plurality of passageways;
   2) a first major surface;
   3) a plurality of ports at the first major surface, each port defined by an end of one of the passageways; and
   4) at least one heating element in or adjacent to at least one of the plurality of passageways that increases the temperature of a wall of the at least one of the plurality of passageways, wherein the at least one heating element comprises a heating fluid, wherein the at least one heating element further comprises a structure that increases heat transfer, wherein the structure that increases heat transfer comprises individual posts;
   wherein the burner body comprises a plurality of layers of metal directly bonded to each other; and
   generating, with the manufacturing device by an additive manufacturing process, the burner body based on the digital object.

12. A system comprising:
   a display that displays a 3D model of a burner body; and
   one or more processors that, in response to the 3D model selected by a user, cause a 3D printer to create a physical object of the burner body, the burner body comprising:
   1) a plurality of passageways;
   2) a first major surface;
   3) a plurality of ports at the first major surface, each port defined by an end of one of the passageways; and
   4) at least one heating element in or adjacent to at least one of the plurality of passageways that increases the temperature of a wall of the at least one of the plurality of passageways, wherein the at least one heating element comprises a heating fluid, wherein the at least one heating element further comprises a structure that increases heat transfer, wherein the structure that increases heat transfer comprises individual posts;
   wherein the burner body comprises a plurality of layers of metal directly bonded to each other.

* * * * *